(12) United States Patent
Tanaka et al.

(10) Patent No.: US 8,721,094 B2
(45) Date of Patent: May 13, 2014

(54) LENS SYSTEM AND OPTICAL APPARATUS

(75) Inventors: Issei Tanaka, Yokohama (JP); Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 436 days.

(21) Appl. No.: 12/956,109

(22) Filed: Nov. 30, 2010

(65) Prior Publication Data

US 2011/0128630 A1 Jun. 2, 2011

(30) Foreign Application Priority Data

Nov. 30, 2009 (JP) .................................. 2009-272048

(51) Int. Cl.
*G02B 27/00* (2006.01)

(52) U.S. Cl.
USPC ......................................................... 359/601

(58) Field of Classification Search
USPC .................. 359/785, 796, 783, 642, 708, 601
See application file for complete search history.

(56) References Cited

U.S. PATENT DOCUMENTS

| | | | |
|---|---|---|---|
| 4,099,843 A | 7/1978 | Imai | |
| 4,390,250 A | 6/1983 | Imai | |
| 5,490,012 A | 2/1996 | Ohshita | |
| 6,636,364 B2 | 10/2003 | Sato | |
| 6,865,031 B2 | 3/2005 | Hoshi | |
| 8,498,065 B2 | 7/2013 | Obama | |
| 2002/0048091 A1 | 4/2002 | Sato | |
| 2003/0156336 A1 | 8/2003 | Hoshi | |
| 2005/0286138 A1 | 12/2005 | Matsusaka | |
| 2009/0135702 A1* | 5/2009 | Usami et al. ............ | 369/100 |

FOREIGN PATENT DOCUMENTS

| | | | |
|---|---|---|---|
| JP | 52-105816 | A | 9/1977 |
| JP | 57-30814 | | 2/1982 |
| JP | 05-188290 | A | 7/1993 |
| JP | 2000-356704 | A | 12/2000 |
| JP | 2000-356704 | A | 12/2000 |
| JP | 2002-131631 | | 5/2002 |
| JP | 2003-241084 | A | 8/2003 |
| JP | 2006-11096 | A | 1/2006 |
| JP | 2007-304224 | A | 11/2007 |
| JP | 2007-322655 | A | 12/2007 |
| JP | 2007-333790 | A | 12/2007 |
| JP | 2007-333790 | A | 12/2007 |

(Continued)

OTHER PUBLICATIONS

English version of International Preliminary Report on Patentability issued Feb. 8, 2011, in International Patent Application No. PCT/JP2009/062076.

*Primary Examiner* — James Greece
*Assistant Examiner* — Sharrief Broome
(74) *Attorney, Agent, or Firm* — Miles & Stockbridge P.C.

(57) ABSTRACT

A lens system comprising, in order from an object side: a first lens group G1; and a second lens group G2 having positive refractive power; the first lens group G1 including a sub-lens group GS11 having positive refractive power, and a sub-lens group GS12 having negative refractive power, the sub-lens group GS12 having negative refractive power including a meniscus lens having a convex surface facing the object side, given conditions being satisfied: an antireflection coating being formed on at least one optical surface in the first lens group G1 and the second lens group G2, and the antireflection coating including at least one layer formed by a wet-process, thereby providing a lens system having high optical performance with excellently correcting various aberrations and suppressing ghost images and flare, and an optical apparatus equipped therewith.

31 Claims, 27 Drawing Sheets

(56) References Cited

FOREIGN PATENT DOCUMENTS

| JP | 2008008960 A | * | 1/2008 |
| JP | 2009-192996 A | | 8/2009 |
| JP | 2009-198854 A | | 9/2009 |

* cited by examiner

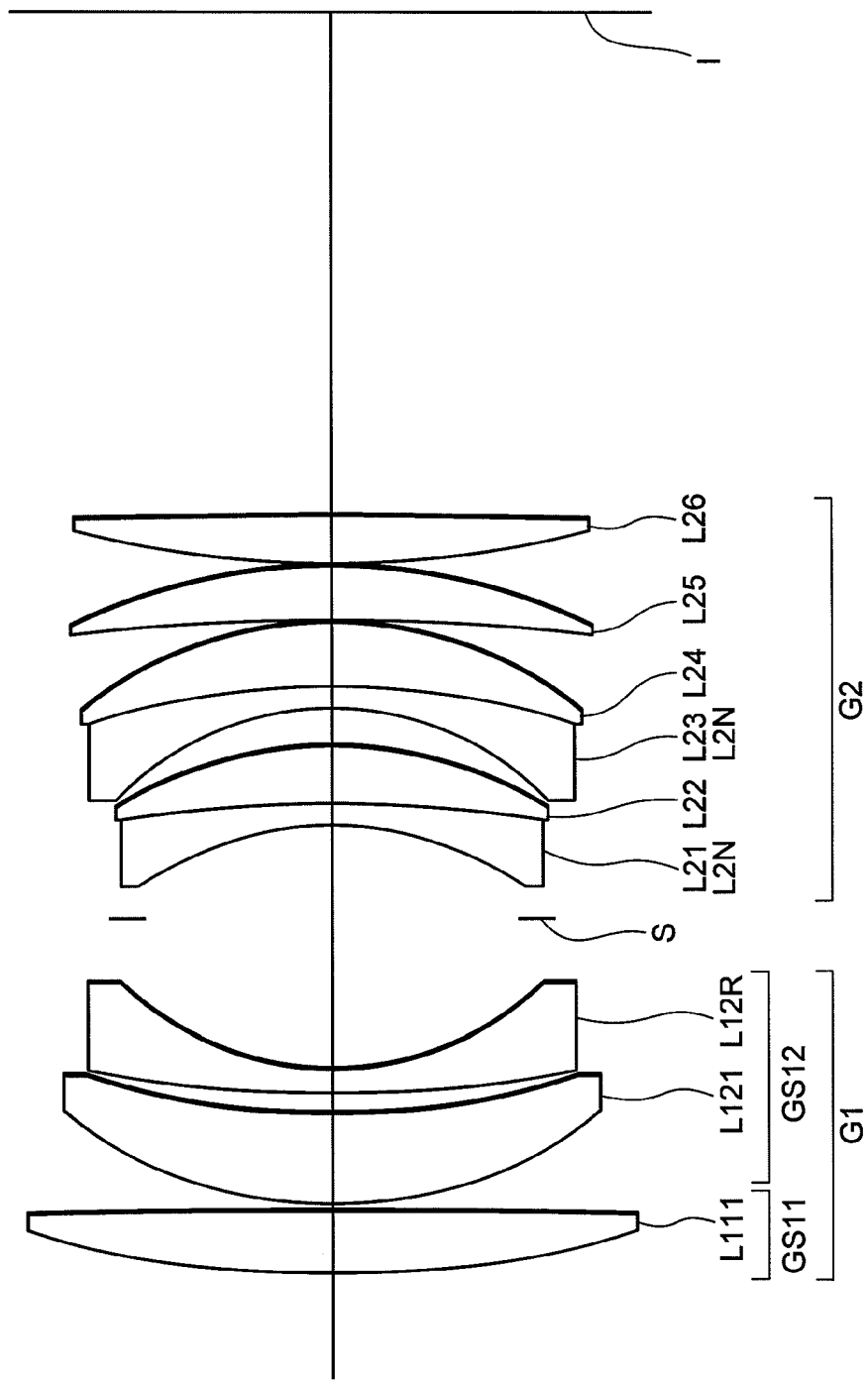

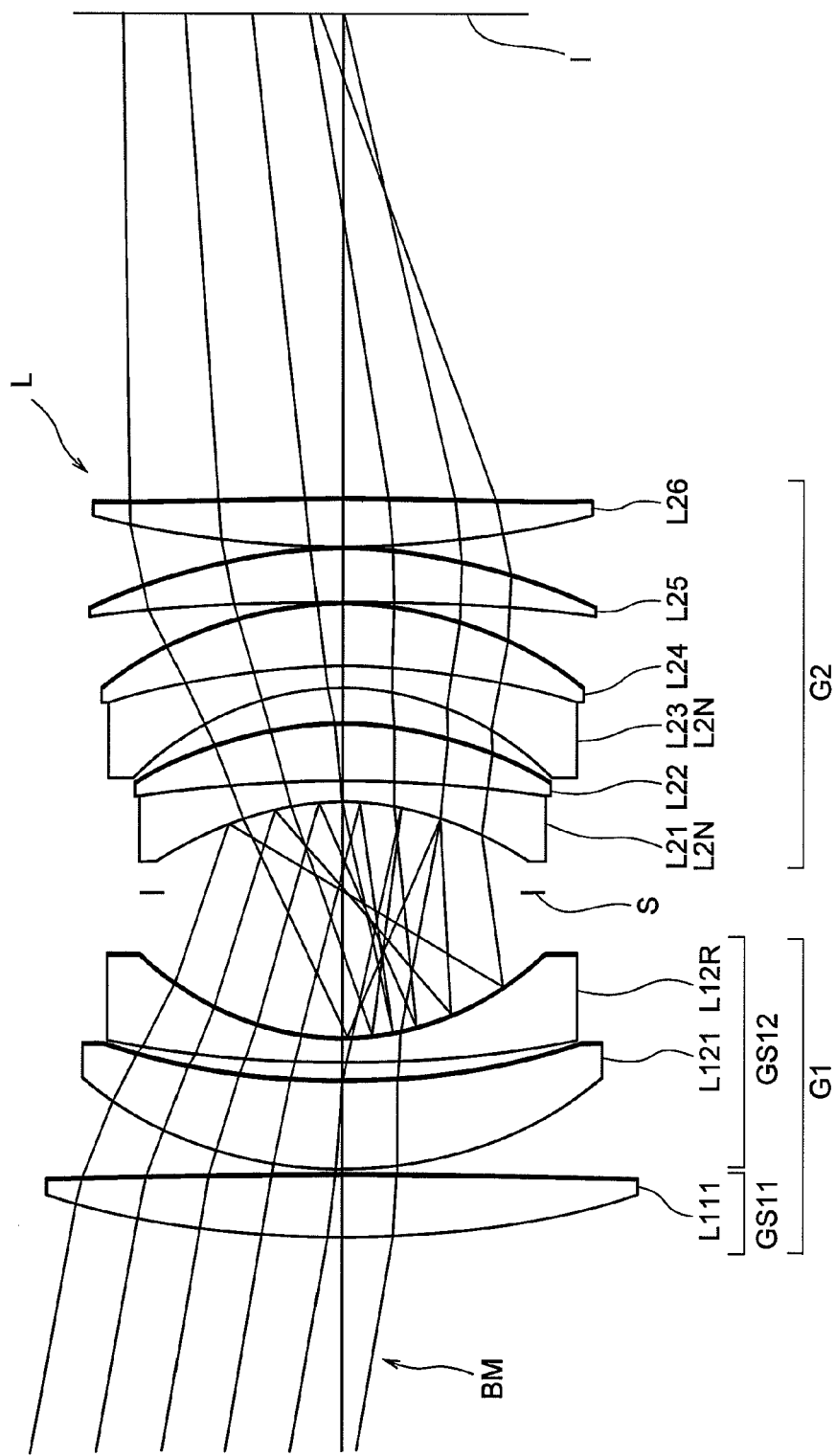

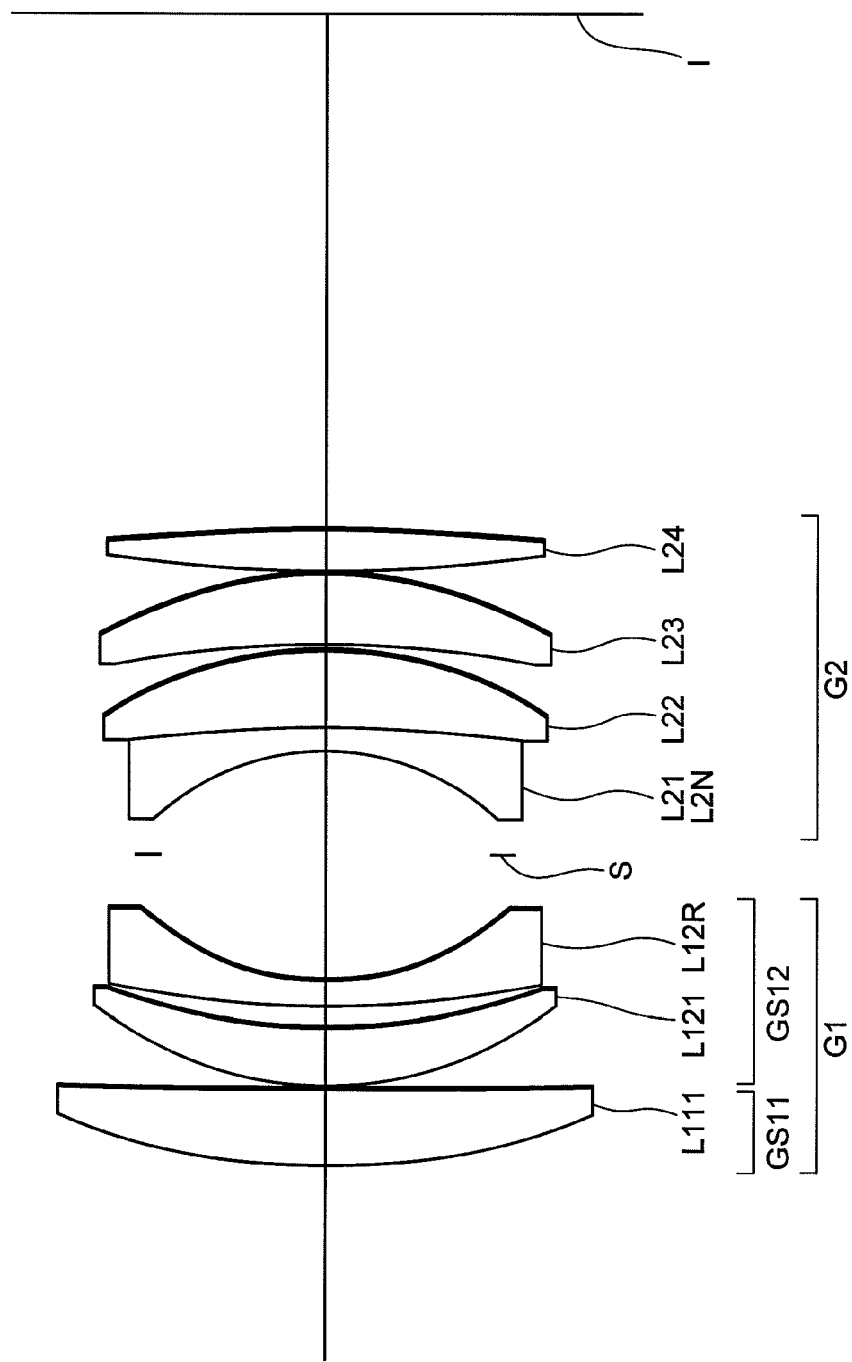

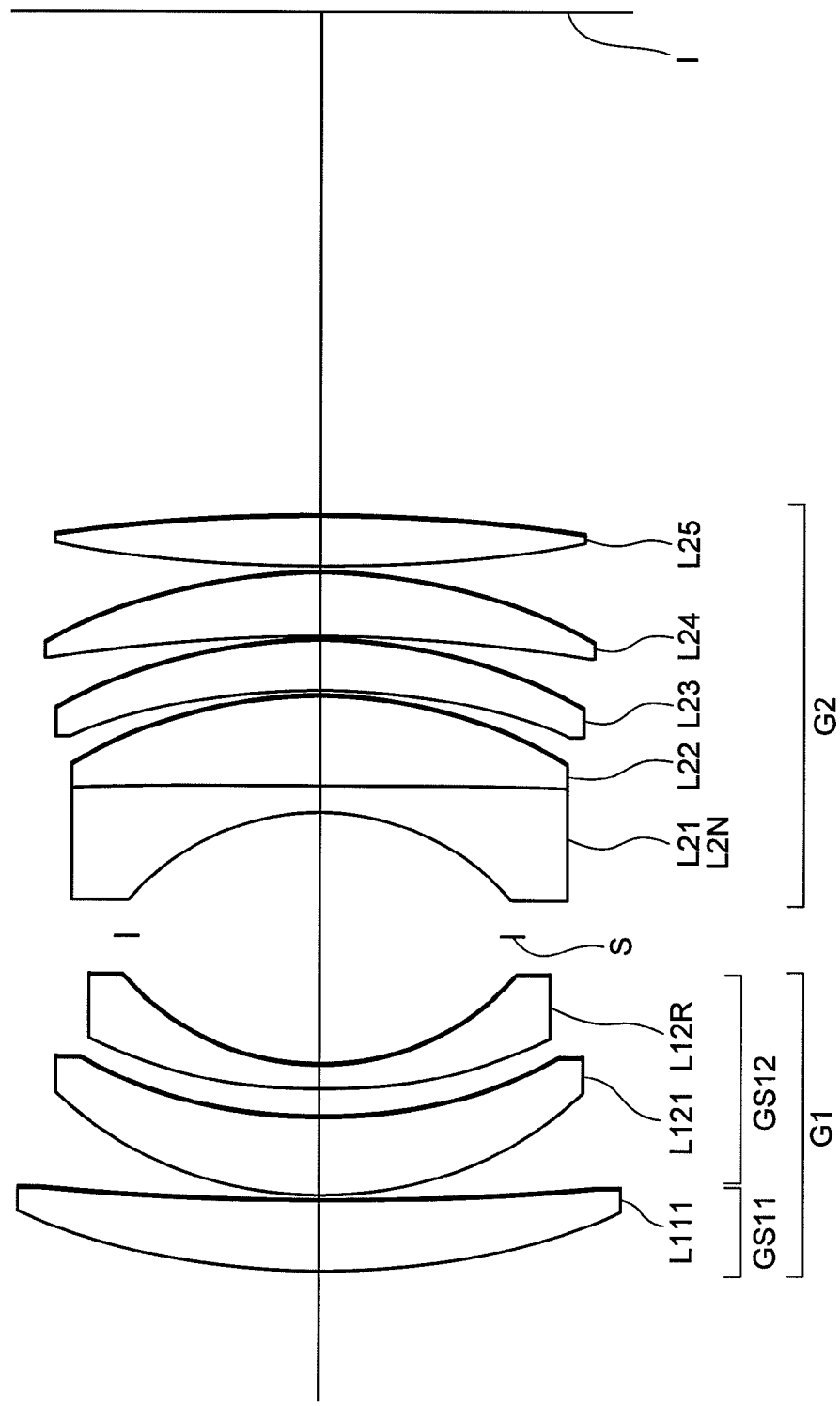

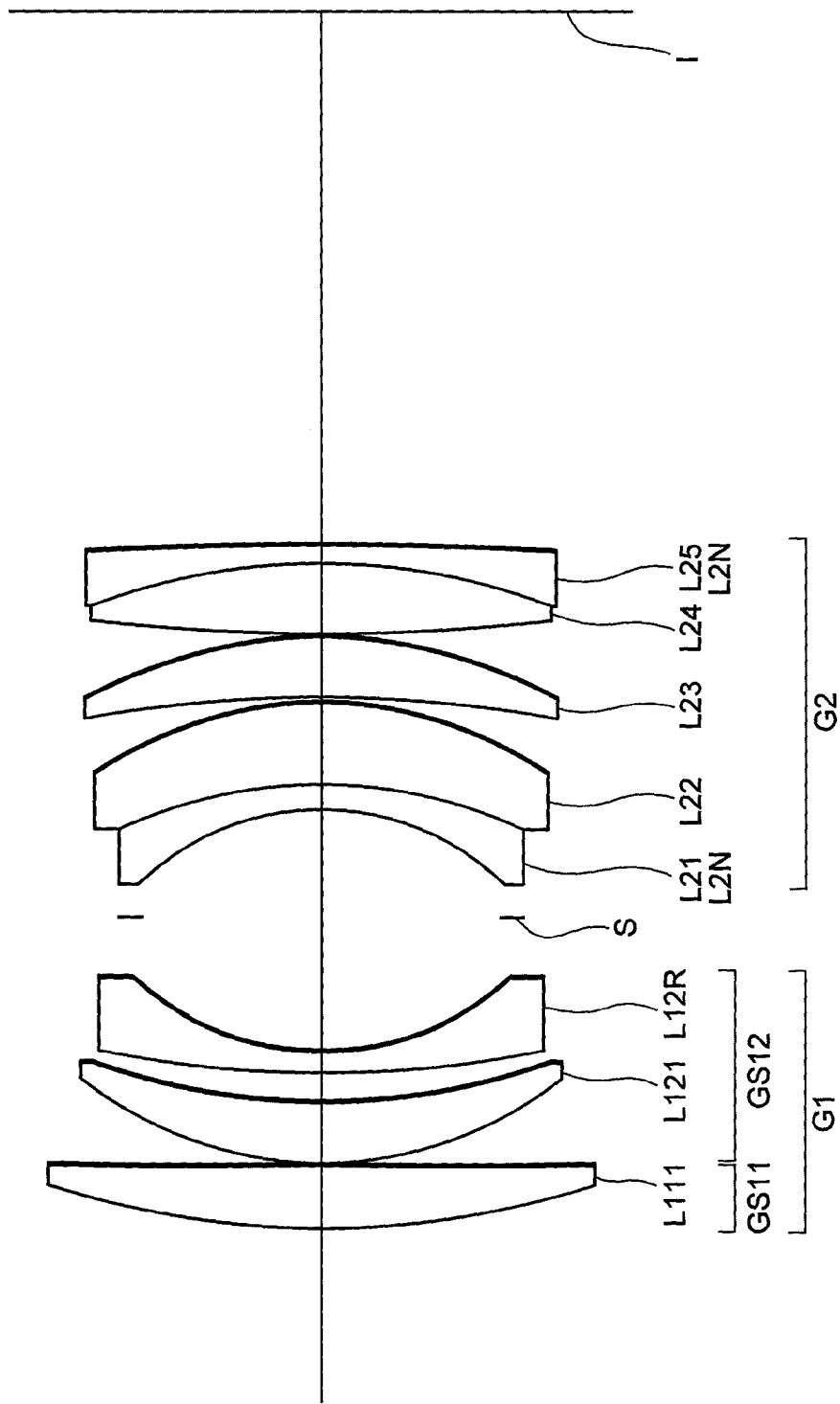

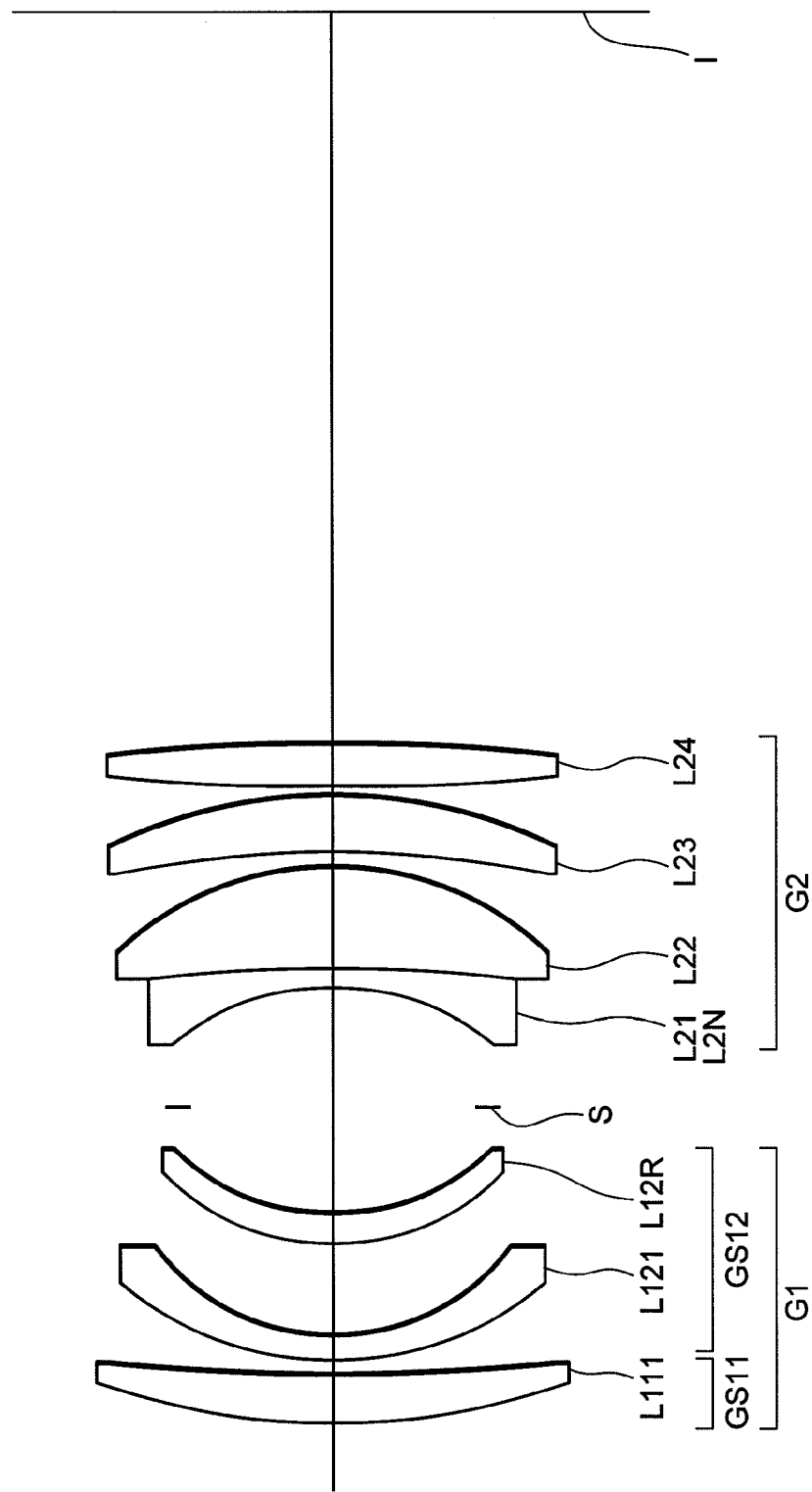

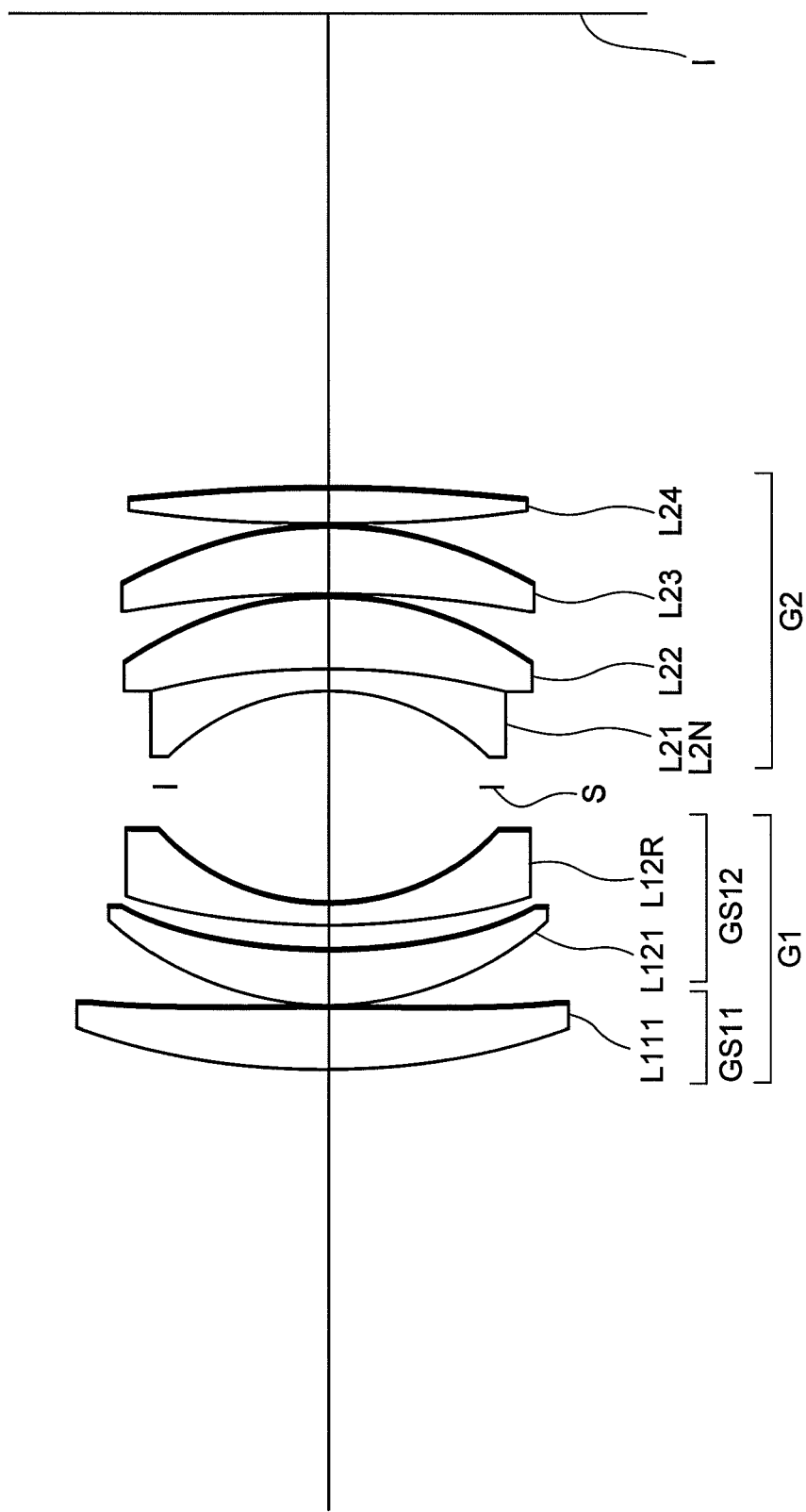

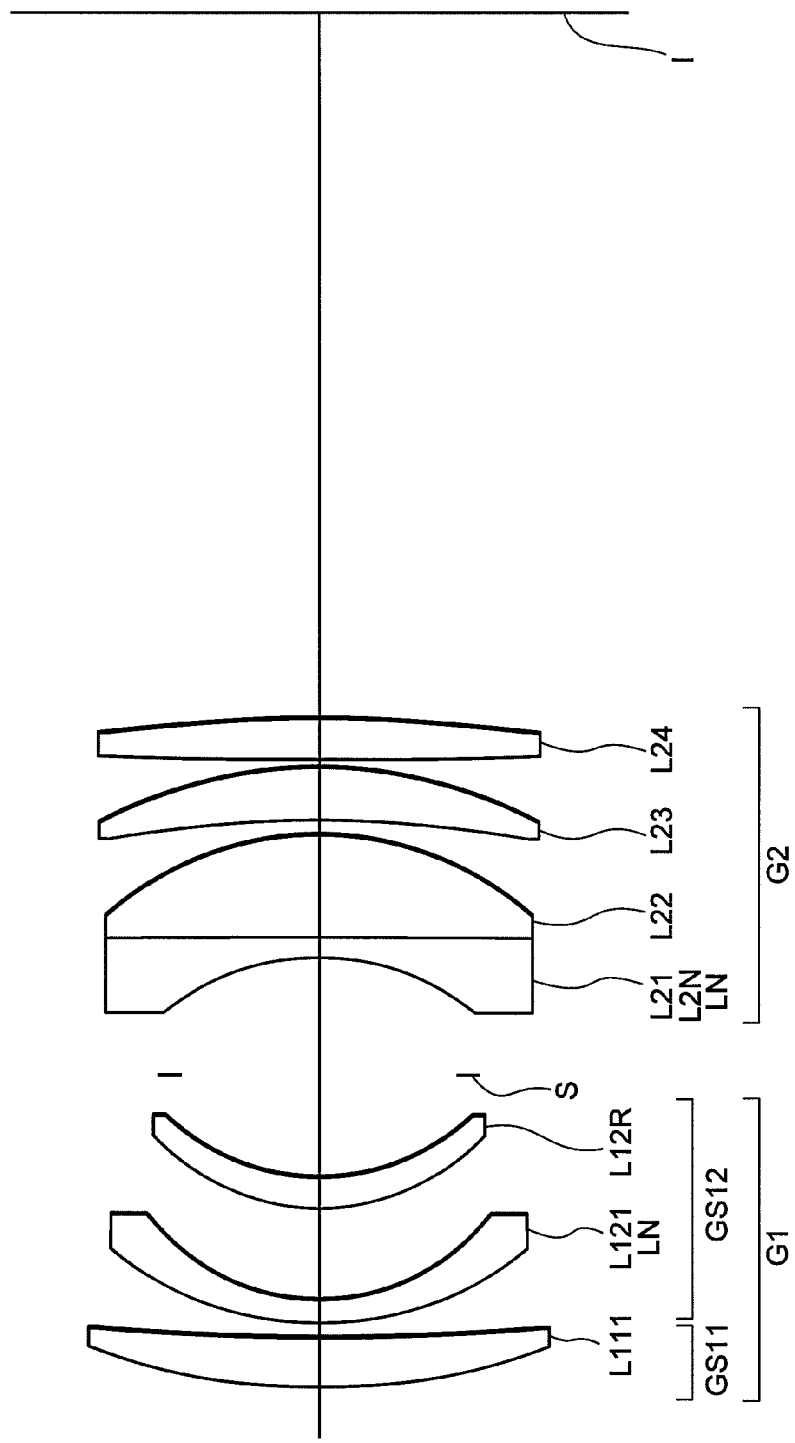

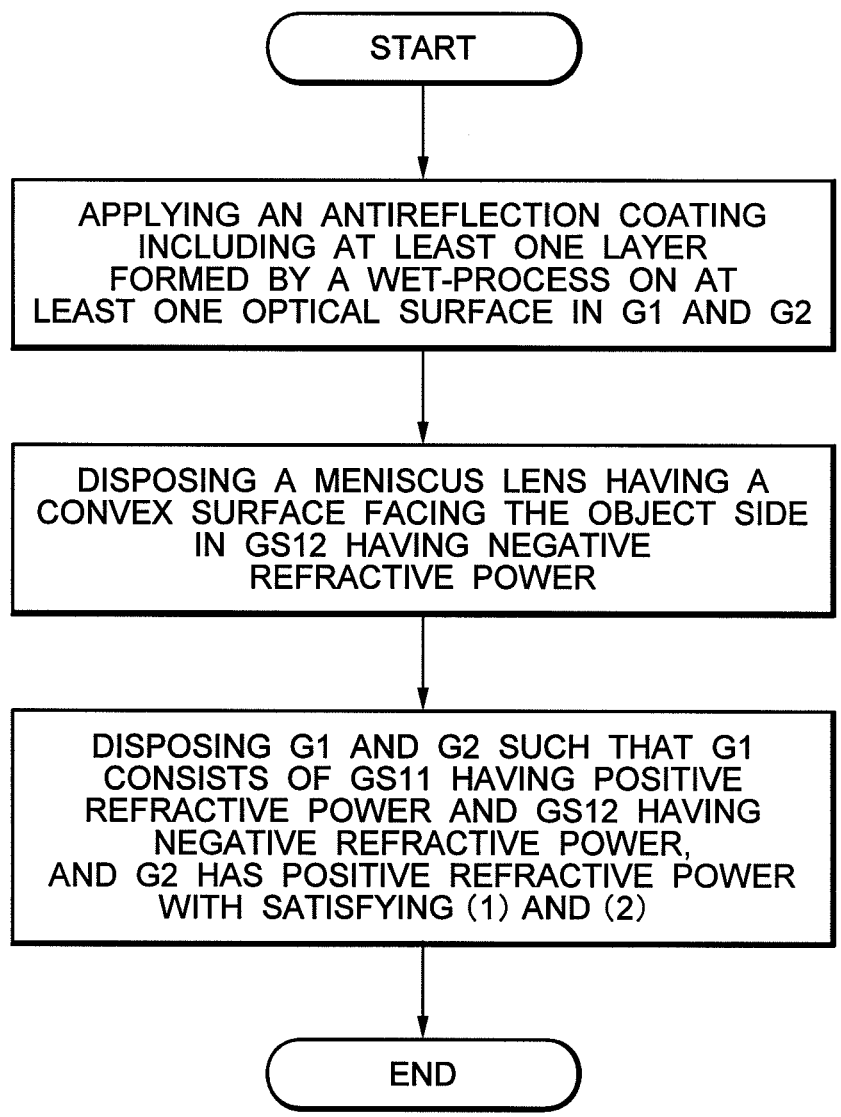

LENS SYSTEM AND OPTICAL APPARATUS

The disclosure of the following priority application is herein incorporated by reference:
Japanese Patent Application No. 2009-272048 filed on Nov. 30, 2009.

BACKGROUND OF THE INVENTION

1. Field of the Invention

The present invention relates to a lens system suitable for an interchangeable lens for a single-lens reflex camera and a photocopy lens, and an optical apparatus equipped with the lens system.

2. Related Background Art

A so-called double-Gauss type lens system has been used as a lens system used for an interchangeable lens for a single-lens reflex camera and a photocopy lens, and a lot of lens systems have been proposed in such as Japanese Patent Application Laid-Open No. 2007-333790. Regarding such a double-Gauss type lens system, request for suppressing ghost images and flare, which deteriorate optical performance, as well as aberrations becomes increasingly strong. Accordingly, a higher optical performance is required to antireflection coatings applied to a lens surface, so that in order to meet such request, multilayer design technology and multilayer coating technology are continuously progressing (for example, see Japanese Patent Application Laid-Open No. 2000-356704).

However, a conventional double-Gauss type lens system generates large coma, so that it does not have sufficiently high optical performance. In addition, there is a problem that reflection light producing ghost images and flare is liable to be generated.

SUMMARY OF THE INVENTION

The present invention is made in view of the above-described problem, and has an object to provide a double-Gauss type lens system capable of accomplishing excellent optical performance with reducing ghost images and flare, and an optical apparatus equipped with the lens system.

According to a first aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the following conditional expressions (1) and (2) being satisfied:

$$1.910 < ndh \quad (1)$$

$$-0.400 < f/f1 < 0.500 \quad (2)$$

where $ndh$ denotes a refractive index at d-line (wavelength=587.6 nm) of a lens having the highest refractive index at d-line composing the lens system, $f1$ denotes a focal length of the first lens group, and $f$ denotes a focal length of the lens system, an antireflection coating being formed on at least one optical surface in the first lens group and the second lens group, and the antireflection coating including at least one layer formed by a wet-process.

According to a second aspect of the present invention, there is provided an optical apparatus equipped with the lens system according to the first aspect.

According to a third aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the lens system including at least one negative lens satisfying the following conditional expressions (4) and (2):

$$1.820 < nNh \quad (4)$$

$$-0.400 < f/f1 < 0.500 \quad (2)$$

where $nNh$ denotes a refractive index at d-line (wavelength=587.6 nm) of the negative lens, $f1$ denotes a focal length of the first lens group, and $f$ denotes a focal length of the lens system, an antireflection coating being formed on at least one optical surface in the first lens group and the second lens group, and the antireflection coating including at least one layer formed by a wet-process.

According to a fourth aspect of the present invention, there is provided an optical apparatus equipped with the lens system according to the third aspect.

According to a fifth aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the following conditional expressions (9) and (2) being satisfied:

$$1.890 < n2dh \quad (9)$$

$$-0.400 < f/f1 < 0.500 \quad (2)$$

where $n2dh$ denotes a refractive index at d-line (wavelength=587.6 nm) of a lens having the highest refractive index at d-line composing the second lens group, $f1$ denotes a focal length of the first lens group, and $f$ denotes a focal length of the lens system, an antireflection coating being formed on at least one optical surface in the first lens group and the second lens group, and the antireflection coating including at least one layer formed by a wet-process.

According to a sixth aspect of the present invention, there is provided a method for manufacturing a lens system including, in order from an object side along an optical axis, a first lens group and a second lens group including steps of: applying an antireflection coating including at least one layer formed by a wet-process on at least one optical surface in the first lens group and the second lens group; disposing a meniscus lens having a convex surface facing the object side in a sub-lens group having negative refractive power; disposing the first lens group and the second lens group in such a manner that the first lens group consists of a sub-lens group having positive refractive power and the sub-lens group having negative refractive power, and the second lens group has positive refractive power with satisfying the following conditional expressions (1) and (2):

$$1.910 < ndh \quad (1)$$

$$-0.400 < f/f1 < 0.500 \quad (2)$$

where $ndh$ denotes a refractive index at d-line (wavelength=587.6 nm) of a lens having the highest refractive index at d-line composing the lens system, $f1$ denotes a focal length of the first lens group, and $f$ denotes a focal length of the lens system.

According to a seventh aspect of the present invention, there is provided a method for manufacturing a lens system including, in order from an object side along an optical axis, a first lens group and a second lens group including steps of: applying an antireflection coating including at least one layer formed by a wet-process on at least one optical surface in the first lens group and the second lens group; disposing a meniscus lens having a convex surface facing the object side in a sub-lens group having negative refractive power; disposing the first lens group and the second lens group in such a manner that the first lens group consists of a sub-lens group having positive refractive power and the sub-lens group having negative refractive power, the second lens group having positive refractive power, and at least one negative lens satisfying the following conditional expressions (4) and (2):

$$1.820 < nNh \tag{4}$$

$$0.400 < f/f1 < 0.500 \tag{2}$$

where nNh denotes a refractive index at d-line (wavelength=587.6 nm) of the negative lens, f1 denotes a focal length of the first lens group, and f denotes a focal length of the lens system.

The present invention makes it possible to provide a lens system having high optical performance with suppressing ghost images and flare as well as excellently correcting various aberrations, and an optical apparatus equipped with the lens system.

BRIEF DESCRIPTION OF THE DRAWINGS

FIG. 1 is a sectional view showing a lens configuration of a lens system according to Example 1.

FIGS. 2A and 2B are graphs showing various aberrations of the lens system according to Example 1, in which FIG. 2A shows upon focusing on infinity ($\beta$=0.0), and FIG. 2B shows upon focusing on a close object ($\beta$=−1/30).

FIG. 3 is a sectional view showing the lens configuration of the lens system according to Example 1 and is an explanatory view, in which light rays reflected from a first-ghost-generating surface are reflected by a second-ghost-generating surface.

FIG. 4 is a sectional view showing a lens configuration of a lens system according to Example 2.

FIGS. 5A and 5B are graphs showing various aberrations of the lens system according to Example 2, in which FIG. 5A shows upon focusing on infinity ($\beta$=0.0), and FIG. 5B shows upon focusing on a close object ($\beta$=−1/30).

FIGS. 7A and 7B are graphs showing various aberrations of the lens system according to Example 3, in which FIG. 7A shows upon focusing on infinity ($\beta$=0.0), and FIG. 7B shows upon focusing on a close object ($\beta$=1/30).

FIG. 8 is a sectional view showing a lens configuration of a lens system according to Example 4.

FIGS. 9A and 9B are graphs showing various aberrations of the lens system according to Example 4, in which FIG. 9A shows upon focusing on infinity ($\beta$=0.0), and FIG. 9B shows upon focusing on a close object ($\beta$=−1/30).

FIG. 10 is a sectional view showing a lens configuration of a lens system according to Example 5.

FIGS. 11A and 11B are graphs showing various aberrations of the lens system according to Example 5, in which FIG. 11A shows upon focusing on infinity ($\beta$=0.0), and FIG. 11B shows upon focusing on a close object ($\beta$=−1/30).

FIG. 12 is a sectional view showing a lens configuration of a lens system according to Example 6.

FIGS. 13A and 13B are graphs showing various aberrations of the lens system according to Example 6, in which FIG. 13A shows upon focusing on infinity ($\beta$=0.0), and FIG. 13B shows upon focusing on a close object ($\beta$=−1/30).

FIG. 14 is a sectional view showing a lens configuration of a lens system according to Example 7.

FIGS. 15A and 15B are graphs showing various aberrations of the lens system according to Example 7, in which FIG. 15A shows upon focusing on infinity ($\beta$=0.0), and FIG. 15B shows upon focusing on a close object ($\beta$=−1/30).

FIGS. 17A and 17B are graphs showing various aberrations of the lens system according to Example 8, in which FIG. 17A shows upon focusing on infinity ($\beta$=0.0), and FIG. 17B shows upon focusing on a close object ($\beta$=−1/30).

FIG. 18 is a sectional view showing a lens configuration of a lens system according to Example 9.

FIGS. 19A and 19B are graphs showing various aberrations of the lens system according to Example 9, in which FIG. 19A shows upon focusing on infinity ($\beta$=0.0), and FIG. 19B shows upon focusing on a close object ($\beta$=−1/30).

FIG. 27 is a flowchart schematically explaining a method for manufacturing the lens system according to the present embodiment.

DESCRIPTION OF THE MOST PREFERRED EMBODIMENT

Figure 2A:
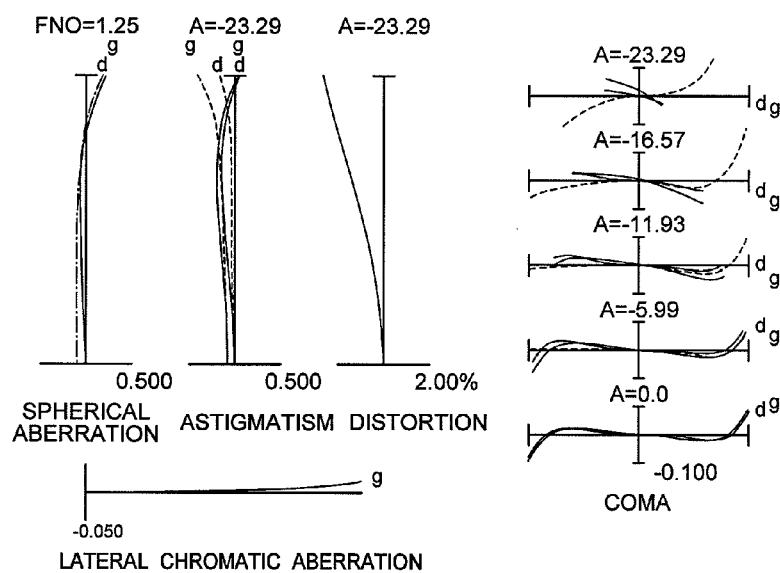

A lens system according to an embodiment of the present application is explained below.

A lens system according to the present embodiment includes, in order from an object side along an optical axis, a first lens group, and a second lens group having positive refractive power. The first lens group is composed of, in order from the object, side, a sub-lens group having positive refractive power, and a sub-lens group having negative refractive power. The sub-lens group having negative refractive power includes a meniscus lens having a convex surface facing the object side. With this lens configuration, it becomes possible to realize so-called double-Gauss type refractive power distribution and to excellently correct distortion and lateral chromatic aberration as well as spherical aberration and curvature of field.

In a lens system according to the present embodiment, the following conditional expressions (1) and (2) are satisfied:

$$1.910 < ndh \tag{1}$$

$$-0.400 < f/f1 < 0.500 \tag{2}$$

where ndh denotes a refractive index at d-line (wavelength=587.6 nm) of a lens having highest refractive index at d-line composing the lens system, and f1 denotes a focal length of the first lens group, and f denotes a focal length of the lens system.

Conditional expression (1) is a condition for excellently correcting spherical aberration and sagittal coma generated in the lens system to obtain high optical performance.

When the value ndh is equal to or falls below the lower limit of conditional expression (1), there are two cases. One is a case that the lens having highest refractive power at d-line is a positive lens, and the other is a case that the lens is a negative lens.

In the former case, since negative spherical aberration generated in the lens system becomes excessively large, in order to correct the aberration curvature of the negative lens is made large (the radius of curvature is made small). Accordingly, sagittal coma is generated excessively by the negative lens. In the latter case, sagittal coma is excessively generated by the negative lens. In either case, higher optical performance cannot be obtained.

In order to secure the effect of the present embodiment, it is preferable to set the lower limit of conditional expression (1) to 1.940. In order to secure the effect of the present embodiment, it is preferable to set the value lower than 2.800. With setting the value ndh lower than 2.800, the lens system can be constructed with sufficiently securing transmittance in visible light of the optical material having the highest refractive power in the lens system.

Conditional expression (2) is for obtaining high optical performance with excellently correcting distortion and lateral chromatic aberration generated in the lens system.

When the ratio f/f1 is equal to or falls below the lower limit of conditional expression (2), refractive power of the first lens group becomes excessively large in negative direction. Accordingly, negative distortion and lateral chromatic aberration become difficult to be corrected, so that high optical performance cannot be obtained.

On the other hand, when the ratio f/f1 is equal to or exceeds the upper limit of conditional expression (2), it becomes difficult to correct positive distortion generated in the first lens group, and high optical performance cannot be obtained.

In order to secure the effect of the present embodiment, it is preferable to set the lower limit of conditional expression (2) to −0.250. In order to further secure the effect of the present embodiment, it is most preferable to set the lower limit of conditional expression (2) to −0.100. In order to further secure the effect of the present embodiment, it is most preferable to set the lower limit of conditional expression (2) to 0.000. In order to still further secure the effect of the present embodiment, it is most preferable to set the lower limit of conditional expression (2) to 0.100. In order to secure the effect of the present embodiment, it is preferable to set the upper limit of conditional expression (2) to 0.400. In order to further secure the effect of the present embodiment, it is most preferable to set the upper limit of conditional expression (2) to 0.360.

In a lens system according to the present embodiment, at least one optical surface in the first lens group and the second lens group is applied with an antireflection coating, and the antireflection coating includes at least one layer that is formed by a wet process.

Moreover, the antireflection coating is a multilayer film, and the layer formed by the wet process is preferably the outermost layer among the layers composing the multilayer coating. With this configuration, since difference in refractive index with respect to the air can be small, reflection of light can be small, so that ghost images and flare can further be suppressed.

When a refractive index at d-line of the layer formed by the wet process is denoted by nd, the refractive index nd is preferable 1.3 or lower. With this configuration, since difference in refractive index with respect to the air can be small, reflection of light can be small, so that ghost images and flare can further be suppressed.

Moreover, the optical surface on which the antireflection coating is formed is preferably a concave surface seen from an aperture stop. With this configuration, since ghost images are liable to be generated on a concave surface facing an image plane, ghost images and flare can effectively be suppressed.

Incidentally, the antireflection coating is not limited to the wet process, the antireflection coating may include at least one layer (formed by a dry process or the like) whose refractive index is 1.30 or less. With this configuration, the same effect as the case formed by the wet process can be obtained. In this case, the layer, composing the multilayer coating, whose refractive index is 1.30 or less is preferably the outermost layer.

In a lens system according to the present embodiment, the first lens group is preferably composed of, in order from the object side along the optical axis, a sub-lens group having positive refractive power, and a sub-lens group having negative refractive power.

With this configuration, it becomes possible to excellently correct distortion and lateral chromatic aberration.

In a lens system according to the present embodiment, an aperture stop is preferably disposed between the first lens group and the second lens group.

With this configuration, it becomes possible to excellently correct distortion and lateral chromatic aberration.

In a lens system according to the present embodiment, the sub-lens group having positive refractive power includes a lens element having positive refractive power disposed to the most object side, and in the lens element, an absolute value of a radius of curvature of an object side surface is preferably smaller than an absolute value of a radius of curvature of an image side surface.

With this configuration, it becomes possible to gradually bend light ray proceeding toward the center of the image by the lens element. As a result, aberrations generated in the lens element, in particular, generation of spherical aberration can be suppressed, so that high optical performance can be obtained.

Incidentally, a lens element in the present application is a generic name of a single lens and a cemented lens.

In a lens system according to the present embodiment, the sub-lens group having positive refractive power is preferably composed of only (a) positive lens element(s).

With this configuration, the number of lenses composing the lens system can be reduced, flare caused by reflections from lens surfaces can be mitigated, and high optical performance can be realized.

In a lens system according to the present embodiment, the following conditional expression (3) is preferably satisfied:

$$24.0 < vdh \tag{3}$$

where vdh denotes an Abbe number at d-line of a lens having the highest refractive index at d-line.

Conditional expression (3) is for obtaining high optical performance with suppressing chromatic aberration.

When the value vdh is equal to or falls below the lower limit of conditional expression (3), there are two cases. When the lens having highest refractive index at d-line is a positive lens, correction of chromatic aberration becomes insufficient, and when the lens having highest refractive index at d-line is a negative lens, correction of chromatic aberration becomes excessive, in either cases high optical performance cannot be obtained.

In order to secure the effect of the present embodiment, it is preferable to set the lower limit of conditional expression (3) to 25.0. In order to further secure the effect of the present embodiment, it is preferable to set the upper limit of conditional expression (3) to 30.0. With setting vdh smaller than 30.0, it becomes possible to excellently correct chromatic difference in spherical aberration, so that high optical performance can be obtained.

In a lens system according to the present embodiment, the lens system preferably includes at least one lens having negative refractive power that satisfies the following conditional expression (4):

$$1.820 < nNh \quad (4)$$

where nNh denotes a refractive index at d-line (wavelength=587.6 nm) of the negative lens.

Conditional expression (4) is for obtaining high optical performance with excellently correcting spherical aberration and sagittal coma generated in the lens system.

When the value nNh is equal to or falls below the lower limit of conditional expression (4), sagittal coma is excessively generated in the negative lens, so that high optical performance cannot be obtained.

In order to secure the effect of the present embodiment, it is preferable to set the lower limit of conditional expression (4) to 1.840. In order to further secure the effect of the present embodiment, it is most preferable to set the lower limit of conditional expression (4) to 1.860. In order to secure the effect of the present embodiment, it is preferable to set the upper limit of conditional expression (4) to 2.800. With setting nNh smaller than 2.800, it becomes possible to sufficiently secure transmittance in visible light range of the optical material of the negative lens.

In a lens system according to the present embodiment, the most image side lens of the sub-lens group having negative refractive power is preferably a lens with negative refractive power having a concave surface facing the image side.

In a lens system according to the present embodiment, the first lens group is composed of the sub-lens group having positive refractive power and the sub-lens group having negative refractive power. Negative spherical aberration generated in the sub-lens group having positive refractive power comes to be excellently corrected by composing the most image side in the sub-lens group having negative refractive power with the lens with negative refractive power having a concave surface facing the image side, so that generation of spherical aberration can be suppressed in low level by the whole of the first lens group. Moreover, coma can be corrected at the same time, so that high optical performance can be obtained as a whole of the lens system.

In a lens system according to the present embodiment, the second lens group preferably includes at least one negative lens having a concave surface facing the object side, and the following conditional expression (5) is preferably satisfied:

$$0.300 < |r2Na|/f < 0.600 \quad (5)$$

where r2Na denotes a radius of curvature of the object side surface of the at least one negative lens.

Conditional expression (5) is for realizing high optical performance with suppressing sagittal coma.

When the ratio |r2Na|/f is equal to or falls below the lower limit of conditional expression (5), it becomes difficult to excellently correct negative spherical aberration generated in the second lens group. Moreover, upon focusing from infinity to a close range by the lens system, or upon changing magnification by a projection apparatus or a photocopy machine equipped with a lens system according to the present embodiment, variation in aberrations becomes excessively large, so that high optical performance cannot be secured from infinity to a close range or over broad magnification range.

In order to secure the effect of the present embodiment, it is preferable to set the lower limit of conditional expression (5) to 0.320. In order to secure the effect of the present embodiment, it is preferable to set the upper limit of conditional expression (5) to 0.530.

In a lens system according to the present embodiment, the at least one negative lens having a concave surface facing the object side is preferable disposed to the most object side in the second lens group.

With disposing at least on negative lens having a concave surface facing the object side to the most object side in the second lens group, it becomes possible to obtain high optical performance with suppressing distortion and lateral chromatic aberration generated in the negative lens In a lens system according to the present embodiment, the following conditional expression (6) is preferably satisfied:

$$0.800 < |r2a|/r1b < 1.200 \quad (6)$$

where r1b denotes a radius of curvature of the most image side lens surface of the first lens group, and r2a denotes a radius of curvature of the most object side lens surface of the second lens group.

Conditional expression (6) is for realizing high optical performance with suppressing sagittal coma.

When the ratio |r2a|/r1b is equal to or falls below the lower limit of conditional expression (6), in other words, when the curvature of the most object side lens surface of the second lens group becomes excessively large with respect to the curvature of the most image side lens surface of the first lens group, sagittal coma is excessively generated on the object side surface of the second lens group, so that high optical performance cannot be realized.

When the ratio |r2a|/r1b is equal to or exceeds the upper limit of conditional expression (6), in other words, when the curvature of the most image side lens surface of the first lens group becomes excessively large with respect to the curvature of the most object side lens surface of the second lens group, sagittal coma is excessively generated on the image side surface of the first lens group, so that high optical performance cannot be realized.

In order to secure the effect of the present embodiment, it is preferable to set the lower limit of conditional expression (6) to 0.900. In order to secure the effect of the present embodiment, it is preferable to set the upper limit of conditional expression (6) to 1.150. In order to further secure the effect of the present embodiment, it is most preferable to set the upper limit of conditional expression (6) to 1.100.

In a lens system according to the present embodiment, the following conditional expression (7) is preferably satisfied:

$$0.600 < Bf/f < 1.000 \quad (7)$$

where Bf denotes a distance along an optical axis between the most image side lens surface of the lens system and the image plane.

Conditional expression (7) is for realizing high optical performance.

When the ratio Bf/f is equal to or falls below the lower limit of conditional expression (7), the back focal length becomes relatively short with respect to the focal length of the lens system, power distribution of the lens system becomes largely away from a symmetrical type, and it becomes difficult to correct distortion, so that high optical performance cannot be realized.

On the other hand, when the ratio Bf/f is equal to or exceeds the upper limit of conditional expression (7), the back focal length becomes relatively long with respect to the focal length of the lens system, power distribution of the lens system becomes largely away from a symmetrical type, and it becomes difficult to correct distortion, so that high optical performance cannot be realized.

In order to secure the effect of the present embodiment, it is preferable to set the lower limit of conditional expression (7) to 0.650. In order to further secure the effect of the present embodiment, it is most preferable to set the lower limit of conditional expression (7) to 0.700. In order to secure the effect of the present embodiment, it is preferable to set the upper limit of conditional expression (7) to 0.850. In order to further secure the effect of the present embodiment, it is most preferable to set the upper limit of conditional expression (7) to 0.800.

Incidentally, when a plane parallel plate is inserted between the most image side lens surface and the image plane, Bf is an equivalent air thickness.

In a lens system according to the present embodiment, a distance between the first lens group and the second lens group is preferably always fixed.

With this configuration, it becomes possible to move the first lens group and the second lens group in a body upon focusing from infinity to a close range or upon changing magnification by a projection apparatus or a photocopy machine equipped with a lens system according to the present embodiment, so that generation of decentering coma generated by decentering the first lens group and the second lens group can be suppressed comparison with a case that the first lens group and the second lens group are moves separately. Accordingly, high optical performance can be realized from infinity to a close range or over broad range of a variable magnification range Moreover, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the lens surface is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Then, a lens system according to the present embodiment seen from another point of view includes, in order from an object side along an optical axis, a first lens group, and a second lens group having positive refractive power. The first lens group is composed of a sub-lens group having positive refractive power, and a sub-lens group having negative refractive power. The sub-lens group having negative refractive power includes a meniscus lens having a convex surface facing the object side. With this lens configuration, it becomes possible to realize a so-called double-Gauss type refractive power distribution and to excellently correct distortion and lateral chromatic aberration as well as spherical aberration and curvature of field.

Moreover, in a lens system according to the present embodiment seen from another point of view, the lens system includes at least one negative lens that satisfies the following conditional expression (4), and the following conditional expressions (4) and (2) are satisfied:

$$1.820 < nNh \tag{4}$$

$$-0.400 < f/f1 < 0.500 \tag{2}$$

where nNh denotes a refractive index at d-line (wavelength=587.6 nm) of the negative lens, and f1 denotes a focal length of the first lens group, and f denotes a focal length of the lens system.

Conditional expression (4) is for obtaining high optical performance with excellently correcting spherical aberration and sagittal coma generated in the lens system. However, conditional expression (4) has already explained above, so that duplicated explanations are omitted.

Conditional expression (2) is for obtaining high optical performance with excellently correcting distortion and lateral chromatic aberration generated in the lens system. However, conditional expression (2) has already explained above, so that duplicated explanations are omitted.

In a lens system according to the present embodiment seen from another point of view, the following conditional expression (8) is preferably satisfied:

$$12.0 < vdN < 24.0 \tag{8}$$

where vdN denotes an Abbe number at d-line of the negative lens.

Conditional expression (8) is for obtaining high optical performance with suppressing chromatic aberration.

When the value vdN is equal to or falls below the lower limit of conditional expression (8), chromatic variation in spherical aberration is corrected excessively, so that high optical performance cannot be obtained. On the other hand, when the value vdN is equal to or exceeds the upper limit of conditional expression (8), chromatic variation in spherical aberration is corrected insufficiently, so that high optical performance cannot be obtained.

In order to secure the effect of the present embodiment, it is preferable to set the lower limit of conditional expression (8) to 16.0. In order to further secure the effect of the present embodiment, it is most preferable to set the lower limit of conditional expression (8) to 18.0.

In a lens system according to the present embodiment seen from another point of view, the following conditional expression (1) is preferably satisfied:

$$1.910 < ndh \tag{1}$$

where ndh denotes a refractive index at d-line (wavelength=587.6 nm) of a lens having highest refractive index at d-line composing the lens system.

Conditional expression (1) is a condition for excellently correcting spherical aberration and sagittal coma generated in the lens system to obtain high optical performance. However, conditional expression (1) has already explained above, so that duplicated explanations are omitted.

In a lens system according to the present embodiment seen from another point of view, the negative lens preferably has a meniscus shape.

With this configuration, it becomes possible to obtain excellent optical performance with suppressing generation of coma.

In a lens system according to the present embodiment seen from another point of view, the negative lens is preferably disposed to the most object side in the second lens group, and the object side surface of the negative lens is preferably a concave surface facing the object side.

With this configuration, it becomes possible to suppress generation of coma, in particular, sagittal coma to obtain high optical performance.

In a lens system according to the present embodiment seen from another point of view, the negative lens is preferably disposed to the most image side in the first lens group, and the image side surface of the negative lens is preferably a concave surface facing the image side.

With this configuration, it becomes possible to suppress generation of coma, in particular, sagittal coma to obtain high optical performance.

In a lens system according to the present embodiment seen from another point of view, the second lens group preferably includes at least one negative lens having a concave surface facing the object side, and the following conditional expression (5) is preferably satisfied:

$$0.300 < |r2Na|/f < 0.600 \quad (5)$$

where r2Na denotes a radius of curvature of the object side surface of the at least one negative lens having a concave surface facing the object side.

Conditional expression (5) is for realizing high optical performance with suppressing sagittal coma. However, conditional expression (5) has already been explained above, so that duplicated explanations are omitted.

In a lens system according to the present embodiment seen from another point of view, the following conditional expression (6) is preferably satisfied:

$$0.800 < |r2a|/r1b < 1.200 \quad (6)$$

where r1b denotes a radius of curvature of the most image side lens surface of the first lens group, and r2a denotes a radius of curvature of the most object side lens surface of the second lens group.

Conditional expression (6) is for realizing high optical performance. However, conditional expression (6) has already explained above, so that duplicated explanations are omitted.

In a lens system according to the present embodiment seen from another point of view, the following conditional expression (7) is preferably satisfied:

$$0.600 < Bf/f < 1.000 \quad (7)$$

where Bf denotes a distance between the most image side lens surface of the lens system and the image plane.

Conditional expression (7) is for realizing high optical performance. However, conditional expression (7) has already been explained above, so that duplicated explanations are omitted.

Then, a lens system according to the present embodiment seen from still another point of view includes, in order from an object along an optical axis, a first lens group and a second lens group having positive refractive power. The first lens group is composed of a sub-lens group having positive refractive power, and a sub-lens group having negative refractive power. The sub-lens group having negative refractive power includes a lens having a meniscus shape with a convex surface facing the object side. With this lens configuration, it becomes possible to realize a so-called double-Gauss type refractive power distribution and to excellently correct distortion and lateral chromatic aberration as well as spherical aberration and curvature of field.

In a lens system according to the present embodiment seen from still another point of view, the following conditional expressions (9) and (2) are satisfied:

$$1.890 < n2dh \quad (9)$$

$$-0.400 < f/f1 < 0.500 \quad (2)$$

where n2dh denotes a refractive index at d-line (wavelength=587.6 nm) of a lens having the highest refractive index at d-line composing the second lens group, f1 denotes a focal length of the first lens group, and f denotes a focal length of the lens system.

Conditional expression (9) is for obtaining high optical performance with excellently correcting spherical aberration and sagittal coma generated in the lens system.

When the value n2dh is equal to or falls below the lower limit of conditional expression (9), there are two cases that the lens having highest refractive index is a positive lens, and the lens is a negative lens.

In the former case, negative spherical aberration generated in the lens system becomes excessively large. In order to correct it, refractive power of the negative lens in the lens system is made large (radius of curvature is made small), so that sagittal coma is excessively generated by the negative lens. In the latter case, sagittal coma is excessively generated by the negative lens. Accordingly, in either case, high optical performance cannot be obtained.

In order to secure the effect of the present embodiment, it is preferable to set the lower limit of conditional expression (9) to 1.900. In order to further secure the effect of the present embodiment, it is most preferable to set the lower limit of conditional expression (9) to 1.910. In order to still further secure the effect of the present embodiment, it is most preferable to set the lower limit of conditional expression (9) to 1.940. In order to secure the effect of the present embodiment, it is preferable to set the value n2dh smaller than 2.800. With setting the value n2dh smaller than 2.800, the lens system can be constructed with sufficiently securing transmittance in visible light of the optical material having the highest refractive power at d-line in the second lens group.

Conditional expression (2) is for obtaining high optical performance with excellently correcting distortion and lateral chromatic aberration generated in the lens system. However, conditional expression (2) has already explained above, so that duplicated explanations are omitted.

In a lens system according to the present embodiment seen from still another point of view, the following conditional expression (10) is preferably satisfied:

$$24.0 < v2dh \quad (10)$$

where v2dh denotes an Abbe number at d-line of a lens having highest refractive index at d-line in the second lens group.

Conditional expression (10) is for obtaining high optical performance with suppressing chromatic aberration.

When the value v2dh is equal to or falls below the lower limit of conditional expression (10), there are two cases. When the lens having highest refractive index at d-line is a positive lens, correction of chromatic difference in spherical aberration becomes insufficient. When the lens having highest refractive index at d-line is a negative lens, correction of chromatic difference in spherical aberration becomes excessive. In either case, high optical performance cannot be obtained.

In order to secure the effect of the present embodiment, it is preferable to set the lower limit of conditional expression (10) to 25.0. In order to secure the effect of the present embodiment, it is preferable to set the value v2dh to smaller than 30.0. With setting the value ν2dh to smaller than 30.0, it becomes possible to excellently correct chromatic difference in spherical aberration, so that high optical performance can be obtained.

In a lens system according to the present embodiment seen from still another point of view, the lens system preferably includes at least one negative lens satisfying the following conditional expression (4):

$$1.820 < nNh \quad (4)$$

where nNh denotes a refractive index at d-line (wavelength=587.6 nm) of the negative lens.

Conditional expression (4) is for obtaining high optical performance with excellently correcting spherical aberration and sagittal coma generated in the lens system. However, conditional expression (4) has already been explained above, so that duplicated explanations are omitted.

In a lens system according to the present embodiment seen from still another point of view, the second lens group includes at least one negative lens having a concave surface facing the object side, and the following conditional expression (5) is preferably satisfied:

$$0.300 < |r2Na|/f < 0.600 \quad (5)$$

where r2Na denotes a radius of curvature of the object side surface of the at least one negative lens having a concave surface facing the object side.

Conditional expression (5) is for realizing high optical performance with suppressing sagittal coma. However, conditional expression (5) has already been explained above, so that duplicated explanations are omitted.

In a lens system according to the present embodiment seen from still another point of view, the at least one negative lens having a concave surface facing the object side is preferably disposed to the most object side in the second lens group.

With this configuration, distortion and lateral chromatic aberration generated in the at least one negative lens having a concave surface facing the object side can be suppressed, so that high optical performance can be obtained.

In a lens system according to the present embodiment seen from still another point of view, the following conditional expression (11) is preferably satisfied:

$$0.750 < |r2a|/r1b < 1.250 \quad (11)$$

where r1b denotes a radius of curvature of the most image side lens surface in the first lens group, and r2a denotes a radius of curvature of the most object side lens surface in the second lens group.

Conditional expression (11) is for realizing high optical performance with suppressing sagittal coma.

When the ratio |r2a|/r1b is equal to or falls below the lower limit of conditional expression (11), in other words, when the curvature of the most object side lens surface of the second lens group becomes excessively large with respect to the curvature of the most image side lens surface of the first lens group, sagittal coma is excessively generated on the object side surface of the second lens group, so that high optical performance cannot be realized.

When the ratio |r2a|/r1b is equal to or exceeds the upper limit of conditional expression (11), in other words, when the curvature of the most image side lens surface of the first lens group becomes excessively large with respect to the curvature of the most object side lens surface of the second lens group, sagittal coma is excessively generated on the image side surface of the first lens group, so that high optical performance cannot be realized.

In order to secure the effect of the present embodiment, it is preferable to set the lower limit of conditional expression (11) to 0.850. In order to secure the effect of the present embodiment, it is preferable to set the upper limit of conditional expression (11) to 1.220. In order to further secure the effect of the present embodiment, it is most preferable to set the upper limit of conditional expression (11) to 1.150.

In a lens system according to the present embodiment seen from still another point of view, the following conditional expression (7) is preferably satisfied:

$$0.600 < Bf/f < 1.000 \quad (7)$$

where Bf denotes a distance along the optical axis between the most image side lens surface of the lens system and the image plane.

Conditional expression (7) is for realizing high optical performance. However, conditional expression (7) has already explained above, so that duplicated explanations are omitted.

An outline of a method for manufacturing a lens system including, in order from an object, a first lens group and a second lens group according to the present embodiment is explained below with reference to FIG. 27.

At first, an antireflection coating including at least one layer formed by a wet-process is applied on at least one optical surface in the first lens group and the second lens group.

A meniscus lens having a convex surface facing the object side is disposed in a sub-lens group having negative refractive power.

The first lens group and the second lens group are disposed into a lens barrel having a cylindrical shape in such a manner that the first lens group consists of a sub-lens group having positive refractive power and the sub-lens group having negative refractive power, and the second lens group has positive refractive power with satisfying the following conditional expressions:

$$1.910 < ndh$$

$$-0.400 < f/f1 < 0.500$$

where ndh denotes a refractive index at d-line (wavelength=587.6 nm) of a lens having the highest refractive index at d-line composing the lens system, f1 denotes a focal length of the first lens group, and f denotes a focal length of the lens system.

Each example according to the present embodiment is explained below with reference to accompanying drawings. Incidentally, a detailed explanation of antireflection coating is separately shown after Examples.

EXAMPLE 1

FIG. 1 is a sectional view showing a lens configuration of a lens system according to Example 1.

The lens system according to Example 1 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a cemented lens constructed by a negative meniscus lens L23 having a concave surface facing the object side cemented with a positive meniscus lens L24 having a concave surface facing the object side with weaker refractive power than the image side surface, a positive meniscus lens L25 having a convex surface facing the image side, and a double convex positive lens L26 disposed to the most image side with stronger refractive power on the object side surface with respect to the image side surface. Light ray come out from the lens L26 forms an image on the image plane I.

Focusing on a close object is carried out by moving the first lens group G1 and the second lens group G2 toward the object side in a body.

Various values associated with the lens system according to Example 1 are listed in Table 1.

In [Specifications], f denotes a focal length of a lens system, FNO denotes an f-number, ω denotes a half angle of view (degree), Y denotes an image height, TL denotes a total lens length that is a distance between the object side surface of the lens L111 upon focusing infinity and an image plane I, and BF denotes a back focal length.

In [Lens Data], the left most column "i" shows optical surface number, the second column "r" shows a radius of curvature of each optical surface (mm), the third column "d" shows a surface distance (mm), the fourth column "nd" shows a refractive index at d-line (wavelength: 587.56 nm), and the fifth column "vd" shows an Abbe number at d-line. In the fifth column "nd" refractive index of the air nd=1.000000 is omitted. In the second column "r", r=∞ indicates a plane surface. In [Variable Distances], INF denotes a state upon focusing on infinity, CLD denotes a state upon focusing on a close object, R denotes a shooting range that is a distance between an object and an image plane I (unit: m), β denotes a shooting magnification, and Bf denotes a back focal length. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

In the lens system according to Example 1, the lens having highest refractive power at d-line is the lens L121. The lenses L21 and L23 are the negative lens L2N having a concave surface facing the object side. Here, the radius of curvature of the object side surface of the lens L21 is r2Na and r2a, and the radius of curvature of the image side surface of the lens L12R is r1b. The radius of curvature of the object side surface of the lens L23 is r2Na.

TABLE 1

[Specifications]

f = 51.60
FNO = 1.25
ω = 23.29
Y = 21.60
TL = 95.78

[Lens Data]

| i | r | d | nd | vd |
|---|---|---|---|---|
| 1 | 81.4768 | 5.0000 | 1.804000 | 46.57 |
| 2 | −2838.8241 | 0.3000 | | |
| 3 | 33.1597 | 7.0000 | 1.950300 | 29.42 |
| 4 | 60.4403 | 1.4000 | | |
| 5 | 95.3280 | 2.0000 | 1.761821 | 26.52 |
| 6 | 23.0471 | 11.3000 | | |
| 7 | ∞ | 7.0000 | Aperture Stop S | |
| 8 | −26.4313 | 1.6000 | 1.805181 | 25.42 |
| 9 | −125.7273 | 4.6000 | 1.804000 | 46.57 |
| 10 | −32.7268 | 2.7000 | | |
| 11 | −23.4449 | 1.7000 | 1.805181 | 25.42 |
| 12 | −64.8415 | 5.0000 | 1.882997 | 40.76 |
| 13 | −31.7094 | 0.1000 | | |
| 14 | −187.5490 | 4.2000 | 1.882997 | 40.76 |
| 15 | −47.3960 | 0.1000 | | |
| 16 | 79.1117 | 3.8000 | 1.804000 | 46.57 |
| 17 | −1019.1299 | (Bf) | | |

[Variable Distances]

| | INF | CLD |
|---|---|---|
| R = | ∞ | 1.64 |
| β = | 0.0 | −1/30 |
| Bf = | 37.9796 | 39.6996 |

[Values for Conditional Expressions]

(1) ndh = 1.950300
(2) f/f1 = 0.30850
(3) vdh = 29.42
(5) |r2Na|/f = 0.51223 (L21)
(5) |r2Na|/f = 0.45435 (L23)
(6) |r2a|/r1b = 1.14684
(7) Bf/f = 0.73603

Figure 2B:
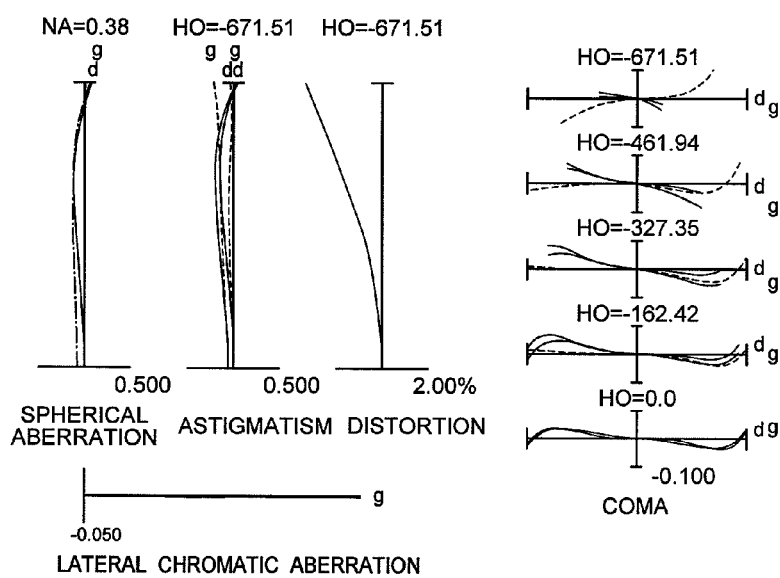

FIGS. 2A and 2B are graphs showing various aberrations of the lens system according to Example 1, in which FIG. 2A shows upon focusing on infinity (β=0.0), and FIG. 2B shows upon focusing on a close object (β=−1/30).

In respective graphs, FNO denotes an f-number, A denotes a half angle of view, d denotes an aberration curve at d-line (wavelength λ=587.6 nm), g denotes an aberration curve at g-line (wavelength λ=435.8 nm), and an aberration curve without mentioning denotes various aberrations with respect to d-line. As is apparent from the respective graphs, the zoom optical system ZL1 according to Example 1 shows superb optical performance as a result of good corrections to various aberrations in each focal length state from the wide-angle end state through the telephoto end state. In graphs showing astigmatism, a solid line indicates a sagittal image plane, and a broken line indicates a meridional image plane. In graphs showing coma, in each half angle of view or each object height, solid lines denote meridional coma at d-line and g-line, a broken line shown in left side of the origin shows sagittal coma generated in meridional direction at d-line, and a broken line shown in right side of the origin shows sagittal coma generated in sagittal direction at d-line.

Incidentally, the same notation is used in the following Examples, so that duplicated explanations are omitted.

As shown in FIG. 3, when a light beam BM from an object is incident on the lens L, the beam is reflected by the object side lens surface (a first-ghost-generating surface whose surface number is eight) of the negative meniscus lens L21, and the reflected light beam is reflected again by the image side surface (a second-ghost-generating surface whose surface number is six) of the negative meniscus lens L12R to reach the image plane I with generating ghost images. Incidentally, the first-ghost-generating surface 8 is a concave surface with respect to the aperture stop S, and the second—ghost-generating surface 6 is a concave surface with respect to the aperture stop S and the image plane I. With forming an antireflection coating corresponding to a broad wavelength range, it becomes possible to effectively suppress ghost images.

As is apparent from the respective graphs, the lens system according to Example 1 shows superb optical performance as a result of good corrections to various aberrations.

EXAMPLE 2

FIG. 4 is a sectional view showing a lens configuration of a lens system according to Example 2.

The lens system according to Example 2 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 2 are listed in Table 2.

In the lens system according to Example 2, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

TABLE 2

[Specifications]

f = 51.61
FNO = 1.45
ω = 23.07
Y = 21.60
TL = 86.39

[Lens Data]

| i | r | d | nd | vd |
|---|---|---|---|---|
| 1 | 52.2387 | 6.0000 | 1.834807 | 42.71 |
| 2 | 565.2751 | 0.1000 | | |
| 3 | 28.1185 | 4.4000 | 2.000690 | 25.46 |
| 4 | 45.6886 | 1.5000 | | |
| 5 | 78.8809 | 2.0000 | 1.860740 | 23.06 |
| 6 | 19.8082 | 9.3000 | | |
| 7 | ∞ | 7.7000 | Aperture Stop S | |
| 8 | −19.2024 | 1.8000 | 1.805181 | 25.42 |
| 9 | −125.5269 | 6.0000 | 1.788001 | 47.37 |
| 10 | −29.9331 | 0.2000 | | |
| 11 | −92.9638 | 5.5000 | 1.834807 | 42.71 |
| 12 | −33.8967 | 0.1000 | | |
| 13 | 112.4183 | 3.3000 | 1.772499 | 49.60 |
| 14 | −161.9377 | (Bf) | | |

[Variable Distances]

| | INF | CLD |
|---|---|---|
| R = | ∞ | 1.64 |
| β = | 0.0 | −1/30 |
| Bf = | 38.4874 | 40.2076 |

[Values for Conditional Expressions]

(1) ndh = 2.000690
(2) f/f1 = 0.29794
(3) vdh = 25.46
(4) nNh = 1.860740
(5) |r2Na|/f = 0.37209
(6) |r2a|/r1b = 0.96941
(7) Bf/f = 0.74579
(8) vdN = 23.06

Figure 5A:
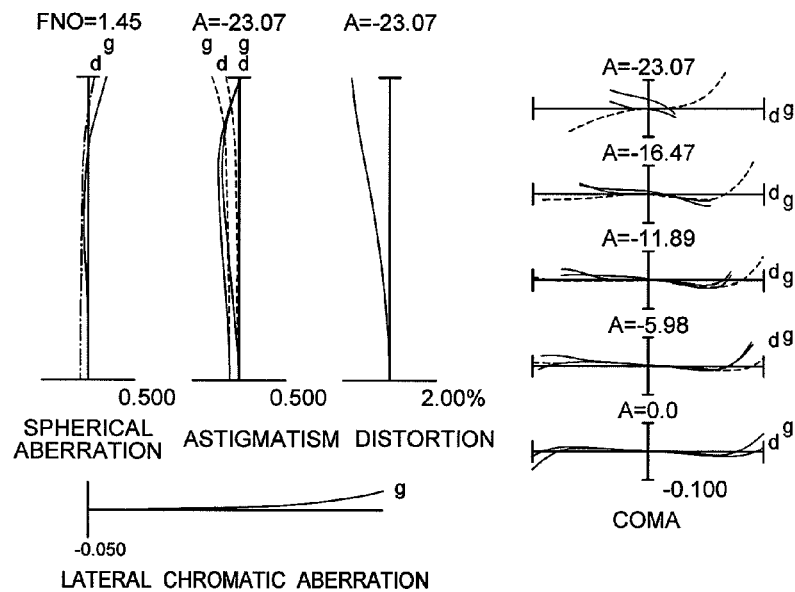
Figure 5B:
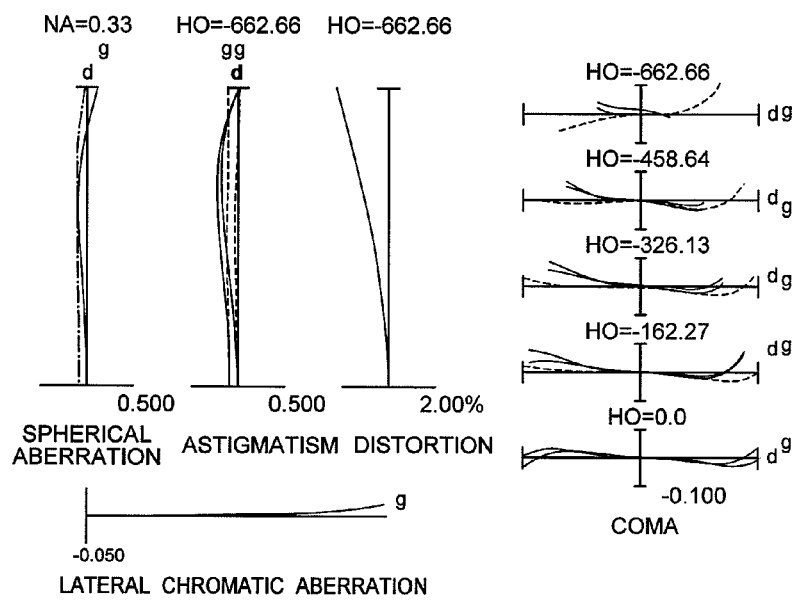

FIGS. 5A and 5B are graphs showing various aberrations of the lens system according to Example 2, in which FIG. 5A shows upon focusing on infinity (β=0.0), and FIG. 5B shows upon focusing on a close object (β=−1/30).

As is apparent from the respective graphs, the lens system according to Example 2 shows superb optical performance as a result of good corrections to various aberrations.

EXAMPLE 3

Figure 6:
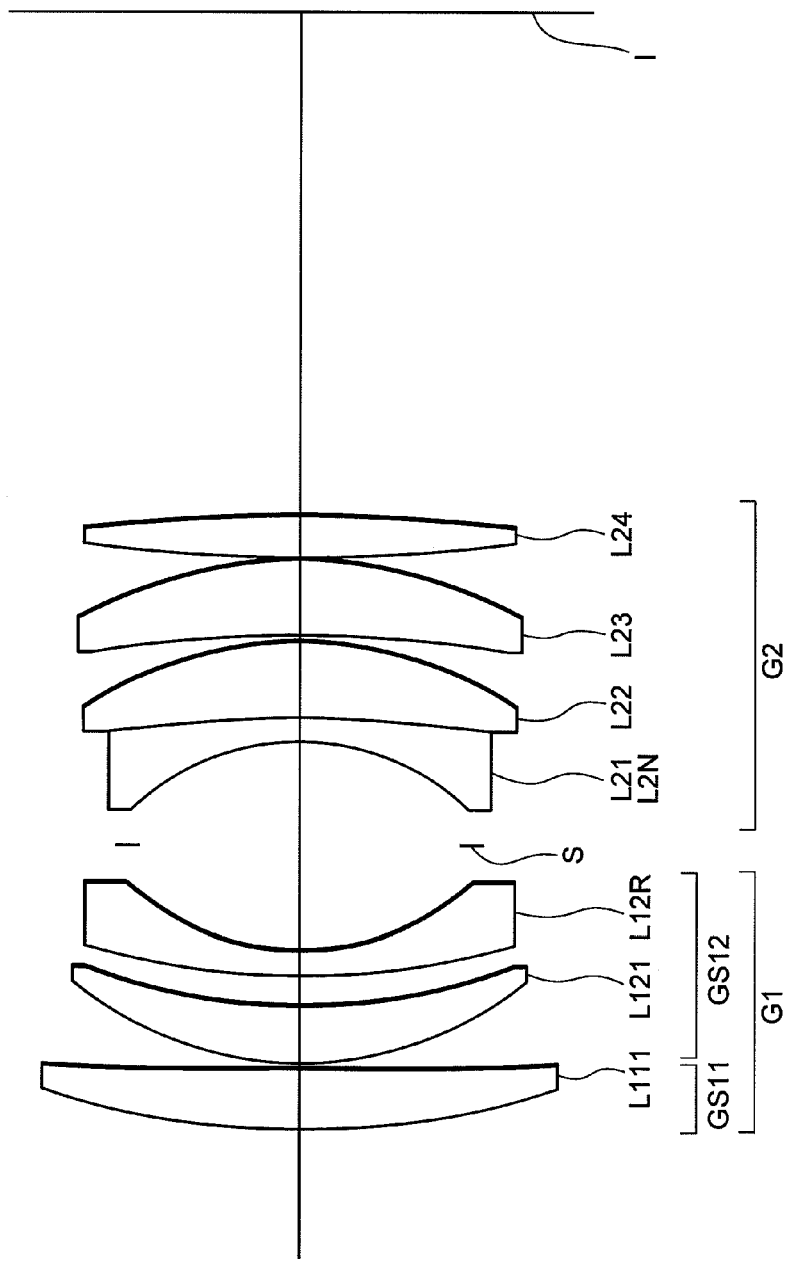
FIG. 6 is a sectional view showing a lens configuration of a lens system according to Example 3.

FIG. 6 is a sectional view showing a lens configuration of a lens system according to Example 3.

The lens system according to Example 3 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 3 are listed in Table 3.

In the lens system according to Example 3, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

TABLE 3

[Specifications]

f = 51.61
FNO = 1.45
ω = 23.14
Y = 21.60
TL = 85.48

[Lens Data]

| i | r | d | nd | vd |
|---|---|---|----|----|
| 1 | 61.1431 | 4.8000 | 1.882997 | 40.76 |
| 2 | 389.5756 | 0.3000 | | |
| 3 | 26.8932 | 4.5000 | 2.000690 | 25.46 |
| 4 | 44.9000 | 2.2000 | | |
| 5 | 57.4287 | 2.0000 | 1.922860 | 20.50 |
| 6 | 19.2263 | 8.0000 | | |
| 7 | ∞ | 7.8000 | Aperture Stop S | |
| 8 | −18.6558 | 1.8000 | 1.805181 | 25.42 |
| 9 | −114.6796 | 6.0000 | 1.788001 | 47.37 |
| 10 | −30.1134 | 0.3000 | | |
| 11 | −114.9741 | 6.0000 | 1.834807 | 42.71 |
| 12 | −34.5098 | 0.1000 | | |
| 13 | 126.4714 | 3.2000 | 1.804000 | 46.57 |
| 14 | −161.9377 | (Bf) | | |

[Variable Distances]

| | INF | CLD |
|---|---|---|
| R = | ∞ | 1.64 |
| β = | 0.0 | −1/30 |
| Bf = | 38.4783 | 40.1986 |

[Values for Conditional Expressions]

(1) ndh = 2.000690
(2) f/f1 = 0.30465
(3) vdh = 25.46
(4) nNh = 1.922860
(5) |r2Na|/f = 0.36149
(6) |r2a|/r1b = 0.97033
(7) Bf/f = 0.74558
(8) vdN = 20.50

Figure 7A:
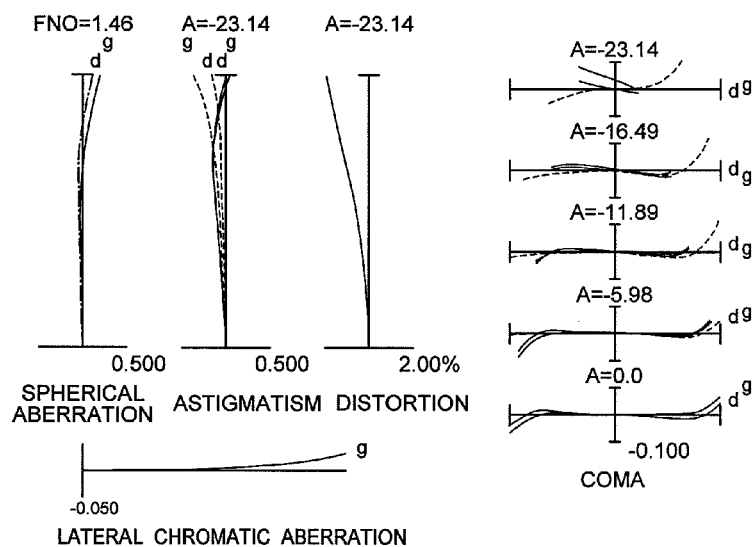
Figure 7B:
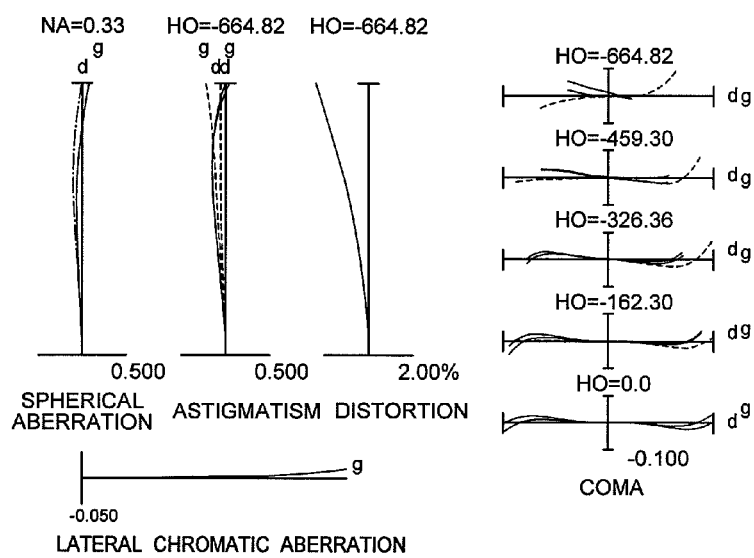

FIGS. 7A and 7B are graphs showing various aberrations of the lens system according to Example 3, in which FIG. 7A shows upon focusing on infinity (β=0.0), and FIG. 7B shows upon focusing on a close object (β=−1/30).

As is apparent from the respective graphs, the lens system according to Example 3 shows superb optical performance as a result of good corrections to various aberrations.

EXAMPLE 4

FIG. 8 is a sectional view showing a lens configuration of a lens system according to Example 4.

The lens system according to Example 4 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a double concave negative lens L21 having stronger refractive power on the object side surface than on the image side surface cemented with a double convex positive lens L22 having weaker refractive power on the object side surface than on the image side surface, a positive meniscus lens L23 having a convex surface facing the image side, a positive meniscus lens L24 having a convex surface facing the image side, and a double convex positive lens L25 disposed to the most image side with stronger refractive power on the object side surface with respect to the image side surface. Light ray come out from the lens L25 forms an image on the image plane I.

Focusing on a close object is carried out by moving the first lens group G1 and the second lens group G2 toward the object side in a body.

Various values associated with the lens system according to Example 4 are listed in Table 4.

In the lens system according to Example 4, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

TABLE 4

[Specifications]

f = 51.63
FNO = 1.25
ω = 23.33
Y = 21.60
TL = 94.94

[Lens Data]

| i | r | d | nd | vd |
|---|---|---|----|----|
| 1 | 57.5740 | 5.5000 | 1.903660 | 31.31 |
| 2 | 206.0906 | 0.2000 | | |
| 3 | 29.5832 | 6.0000 | 2.003300 | 28.27 |

TABLE 4-continued

| | | | | |
|---|---|---|---|---|
| 4 | 38.8499 | 2.0000 | | |
| 5 | 41.1771 | 2.0000 | 1.922860 | 18.90 |
| 6 | 19.7787 | 9.5000 | | |
| 7 | ∞ | 9.2000 | Aperture Stop S | |
| 8 | −19.4166 | 2.0000 | 1.805181 | 25.42 |
| 9 | 3374.4434 | 7.0000 | 1.804000 | 46.57 |
| 10 | −36.6779 | 0.2000 | | |
| 11 | −56.5118 | 4.0000 | 1.882997 | 40.76 |
| 12 | −42.4595 | 0.1000 | | |
| 13 | −143.9382 | 5.0000 | 1.834807 | 42.71 |
| 14 | −44.3487 | 0.3000 | | |
| 15 | 103.1998 | 4.0000 | 1.754999 | 52.32 |
| 16 | −161.9377 | (Bf) | | |

[Variable Distances]

| | INF | CLD |
|---|---|---|
| R = | ∞ | 1.64 |
| β = | 0.0 | −1/30 |
| Bf = | 37.9374 | 39.6583 |

[Values for Conditional Expressions]

(1) ndh = 2.003300
(2) f/f1 = 0.29576
(3) vdh = 28.27
(4) nNh = 1.922860
(5) |r2Na|/f = 0.37608
(6) |r2a|/r1b = 0.98169
(7) Bf/f = 0.73481
(8) vdN = 18.90

Figure 9A:
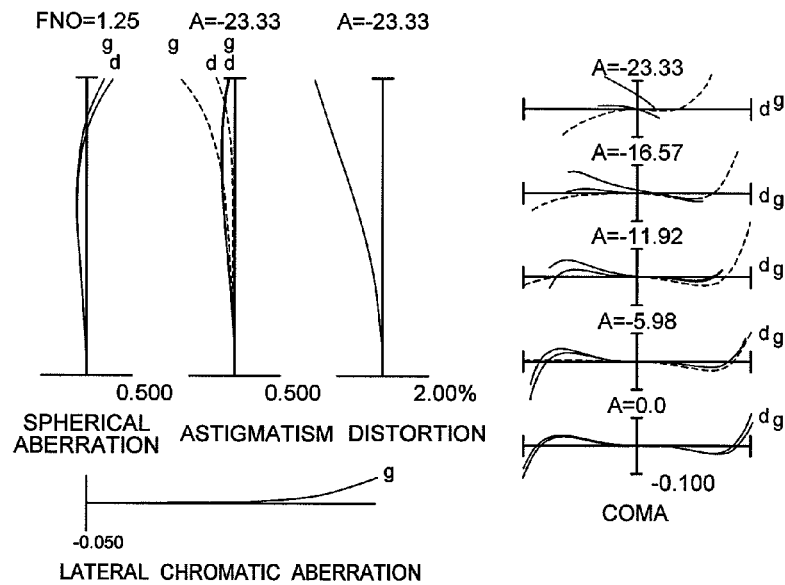
Figure 9B:
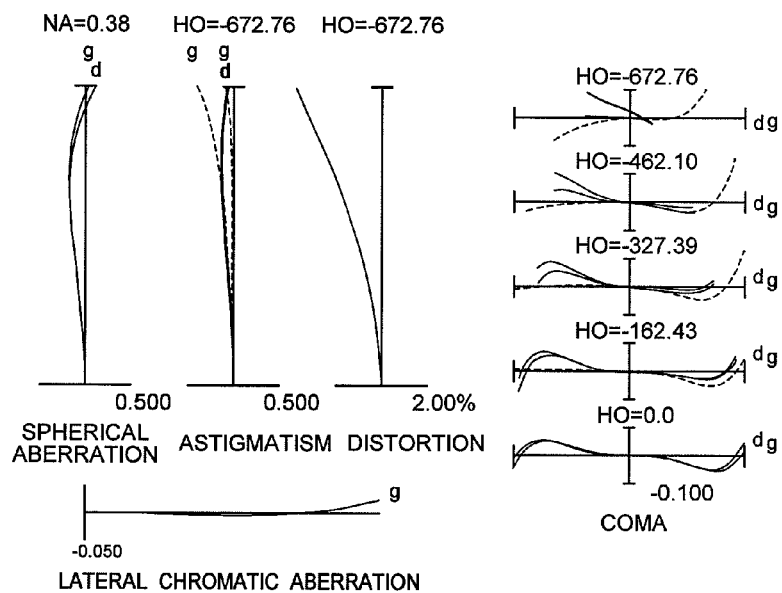

FIGS. 9A and 9B are graphs showing various aberrations of the lens system according to Example 4, in which FIG. 9A shows upon focusing on infinity (β=0.0), and FIG. 9B shows upon focusing on a close object (β=−1/30).

As is apparent from the respective graphs, the lens system according to Example 4 shows superb optical performance as a result of good corrections to various aberrations.

EXAMPLE 5

FIG. 10 is a sectional view showing a lens configuration of a lens system according to Example 5.

The lens system according to Example 5 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a cemented lens constructed by a positive lens L24 having a convex surface facing the image side whose radius of curvature is smaller than that of the object side surface cemented with a negative meniscus lens L25 having a concave surface facing the object side. Light ray come out from the lens L25 forms an image on the image plane I.

Focusing on a close object is carried out by moving the first lens group G1 and the second lens group G2 toward the object side in a body.

Various values associated with the lens system according to Example 5 are listed in Table 5.

In the lens system according to Example 5, the lens having highest refractive power at d-line is the lens L24. The lenses L21 and L25 are the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

TABLE 5

[Specifications]

f = 51.61
FNO = 1.45
ω = 23.13
Y = 21.60
TL = 87.36

[Lens Data]

| i | r | d | nd | vd |
|---|---|---|---|---|
| 1 | 62.5707 | 4.6000 | 1.834807 | 42.71 |
| 2 | 1079.5273 | 0.1000 | | |
| 3 | 27.8402 | 4.5000 | 1.903660 | 31.31 |
| 4 | 48.9187 | 2.0000 | | |
| 5 | 83.6288 | 1.6000 | 1.805181 | 25.42 |
| 6 | 20.6020 | 9.5000 | | |
| 7 | ∞ | 7.7000 | Aperture Stop S | |
| 8 | −19.6349 | 1.8000 | 1.846660 | 23.78 |
| 9 | −36.0084 | 6.0000 | 1.754999 | 52.32 |
| 10 | −28.9194 | 0.2000 | | |
| 11 | −100.0147 | 4.5000 | 1.834807 | 42.71 |
| 12 | −35.2169 | 0.1000 | | |
| 13 | 140.8843 | 5.0000 | 2.003300 | 28.27 |
| 14 | −49.8565 | 1.5000 | 1.922860 | 18.90 |
| 15 | −391.9566 | (Bf) | | |

[Variable Distances]

| | INF | CLD |
|---|---|---|
| R = | ∞ | 1.65 |
| β = | 0.0 | −1/30 |
| Bf = | 38.2645 | 39.9850 |

[Values for Conditional Expressions]

(1) ndh = 2.003300
(2) f/f1 = 0.28536
(3) vdh = 28.27
(4) nNh = 1.846660 (L21)
(4) nNh = 1.922860 (L25)
(5) |r2Na|/f = 0.38041 (L21)
(6) |r2a|/r1b = 0.95306
(7) Bf/f = 0.74135
(8) vdN = 23.78 (L21)
(8) vdN = 18.90 (L25)
(9) n2dh = 2.003300
(10) v2dh = 28.27
(11) |r2a|/r1b = 0.95306

Figure 11A:
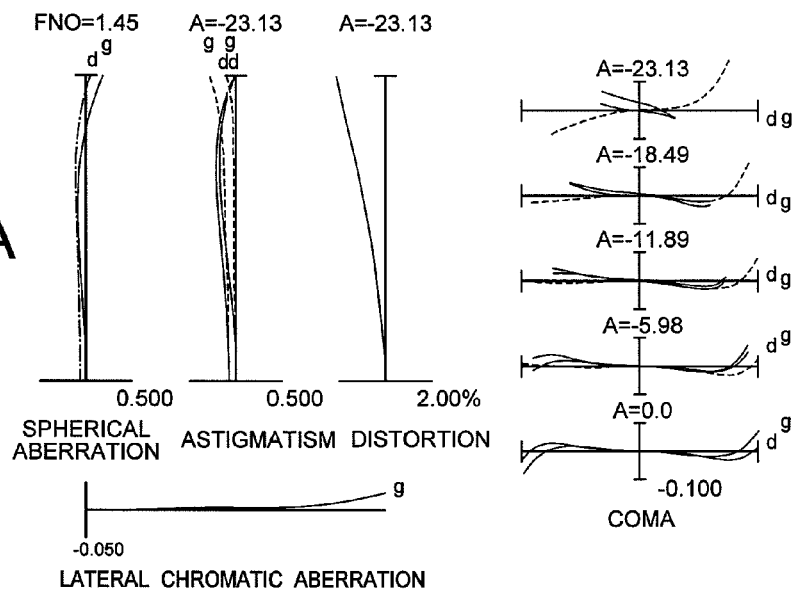
Figure 11B:
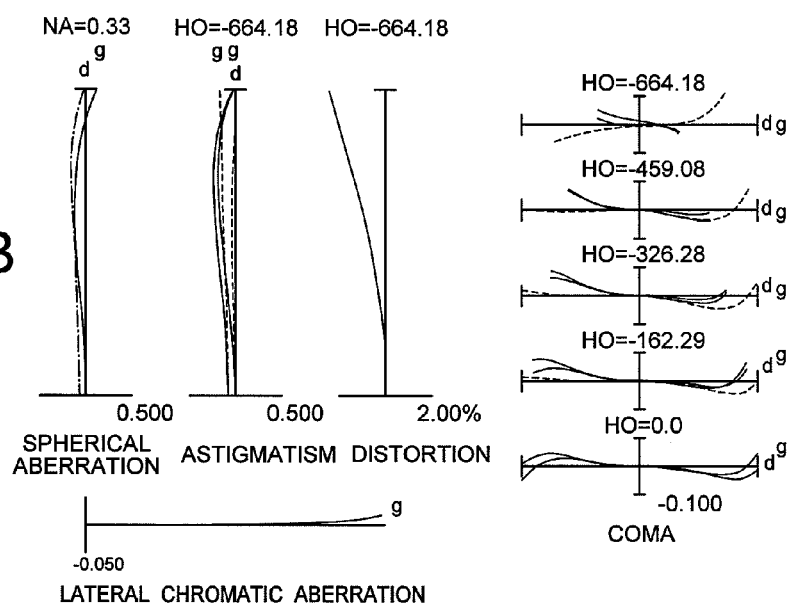

FIGS. 11A and 11B are graphs showing various aberrations of the lens system according to Example 5, in which FIG. 11A shows upon focusing on infinity (β=0.0), and FIG. 11B shows upon focusing on a close object (β=−1/30).

As is apparent from the respective graphs, the lens system according to Example 5 shows superb optical performance as a result of good corrections to various aberrations.

EXAMPLE 6

FIG. 12 is a sectional view showing a lens configuration of a lens system according to Example 6.

The lens system according to Example 6 is composed of, in order from an object side along an optical axis, a first lens group G1 having negative refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a negative meniscus lens L121 having a convex surface facing the object side and a positive meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the image side surface with respect to the object side surface. Light ray come out from the lens L24 forms an image on the image plane I.

Focusing on a close object is carried out by moving the first lens group G1 and the second lens group G2 toward the object side in a body.

Various values associated with the lens system according to Example 6 are listed in Table 6.

In the lens system according to Example 6, the lens having highest refractive power at d-line is the lens L12R. The lenses L121 and L21 are the negative lens LN satisfying conditional expression (4), and the lens L21 is also the negative lens L2N having a concave surface facing the object side. Here, the radius of curvature of the object side surface of the lens L21 is r2Na and r2a, and the radius of curvature of the image side surface of the lens L12R is r1b.

TABLE 6

[Specifications]

f = 51.60
FNO = 2.10
ω = 25.28
Y = 24.00
TL = 108.47

[Lens Data]

| i | r | d | nd | vd |
|---|---|---|---|---|
| 1 | 51.0799 | 4.0000 | 1.799516 | 42.22 |
| 2 | 153.5021 | 1.0000 | | |
| 3 | 25.0934 | 2.0000 | 1.834807 | 42.71 |
| 4 | 16.6855 | 7.0000 | | |
| 5 | 17.7942 | 2.5000 | 2.019600 | 21.45 |
| 6 | 17.4360 | 8.0000 | | |
| 7 | ∞ | 9.0000 | Aperture Stop S | |
| 8 | −20.1623 | 1.5000 | 1.860740 | 23.06 |
| 9 | −141.0470 | 8.0000 | 1.754999 | 52.32 |
| 10 | −24.1458 | 1.0000 | | |
| 11 | −82.3047 | 4.5000 | 1.834807 | 42.71 |
| 12 | −39.2143 | 0.5000 | | |
| 13 | 187.0181 | 3.5000 | 1.804000 | 46.57 |
| 14 | −161.9377 | (Bf) | | |

[Variable Distances]

| | INF | CLD |
|---|---|---|
| R = | ∞ | 1.66 |
| β = | 0.0 | −1/30 |
| Bf = | 55.9690 | 57.6889 |

[Values for Conditional Expressions]

(1) ndh = 2.019600
(2) f/f1 = −0.02715
(4) nNh = 1.834807 (L121)
(4) nNh = 1.860740 (L21)
(5) |r2Na|/f = 0.39073
(6) |r2a|/r1b = 1.15636
(8) vdN = 23.06 (L21)

Figure 13A:
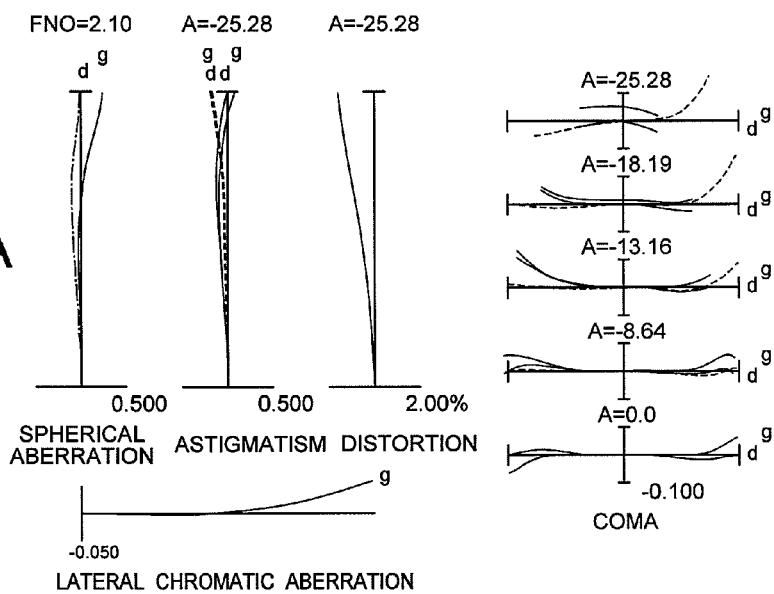
Figure 13B:
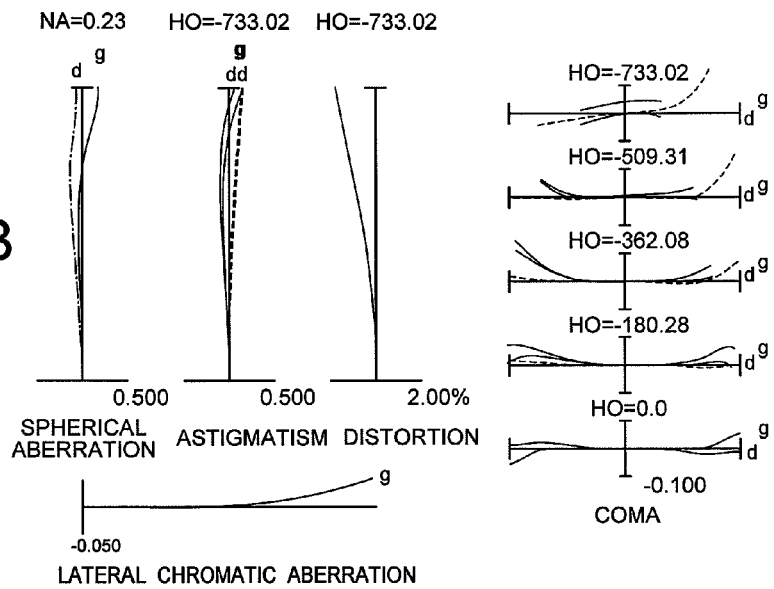

FIGS. 13A and 13B are graphs showing various aberrations of the lens system according to Example 6, in which FIG. 13A shows upon focusing on infinity (β=0.0), and FIG. 13B shows upon focusing on a close object (β=−1/30).

As is apparent from the respective graphs, the lens system according to Example 6 shows superb optical performance as a result of good corrections to various aberrations.

EXAMPLE 7

FIG. 14 is a sectional view showing a lens configuration of a lens system according to Example 7.

The lens system according to Example 7 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 7 are listed in Table 7.

In the lens system according to Example 7, the lens having highest refractive power at d-line is the lens L121. The lens L21 is the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

TABLE 7

[Specifications]

f = 51.61
FNO = 1.45
ω = 23.10
Y = 21.60
TL = 85.66

[Lens Data]

| i | r | d | nd | vd |
|---|---|---|---|---|
| 1 | 61.1028 | 5.2000 | 1.834807 | 42.71 |
| 2 | 421.6037 | 0.1000 | | |
| 3 | 26.6848 | 4.5000 | 2.003300 | 28.27 |
| 4 | 42.4965 | 1.8000 | | |
| 5 | 55.6668 | 2.0000 | 1.808090 | 22.79 |
| 6 | 18.6474 | 9.3000 | | |
| 7 | ∞ | 7.7000 | Aperture stop S | |
| 8 | −18.7111 | 1.8000 | 1.846660 | 23.78 |
| 9 | −64.8673 | 6.0000 | 1.788001 | 47.37 |
| 10 | −29.0381 | 0.2000 | | |
| 11 | −90.5334 | 5.5000 | 1.834807 | 42.71 |
| 12 | −33.0755 | 0.1000 | | |
| 13 | 114.2530 | 3.0000 | 1.772499 | 49.60 |
| 14 | −161.9377 | (Bf) | | |

[Variable Distances]

| | INF | CLD |
|---|---|---|
| R = | ∞ | 1.64 |
| β = | 0.0 | −1/30 |
| Bf = | 38.4641 | 40.1846 |

[Values for Conditional Expressions]

(1) ndh = 2.003300
(2) f/f1 = 0.33461
(3) vdh = 28.27
(4) nNh = 1.846660
(5) |r2Na|/f = 0.36253
(6) |r2a|/r1b = 1.00342
(7) Bf/f = 0.74525
(8) vdN = 23.78

Figure 15A:
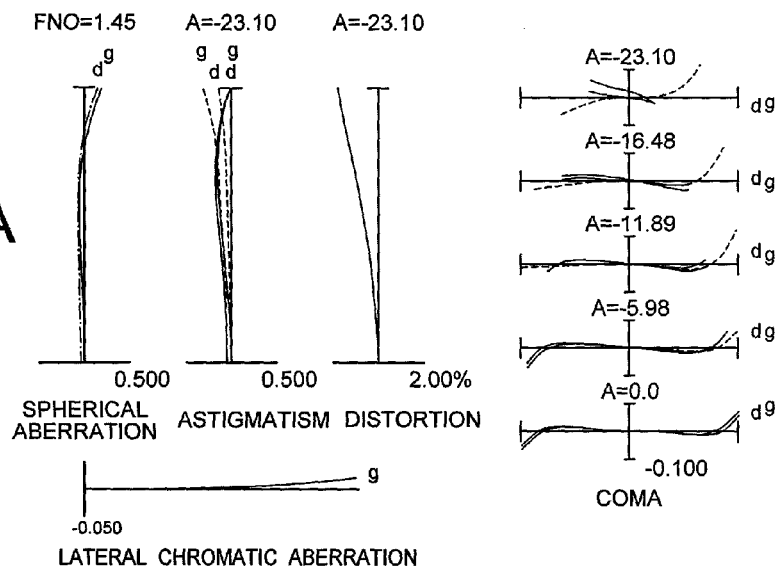
Figure 15B:
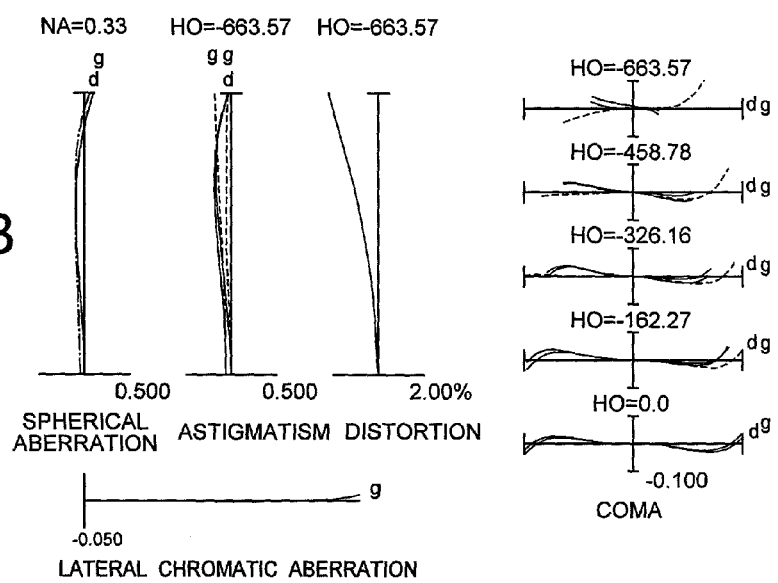

FIGS. 15A and 15B are graphs showing various aberrations of the lens system according to Example 7, in which FIG. 15A shows upon focusing on infinity (β=0.0), and FIG. 15B shows upon focusing on a close object (β=−1/30).

As is apparent from the respective graphs, the lens system according to Example 7 shows superb optical performance as a result of good corrections to various aberrations.

EXAMPLE 8

Figure 16:
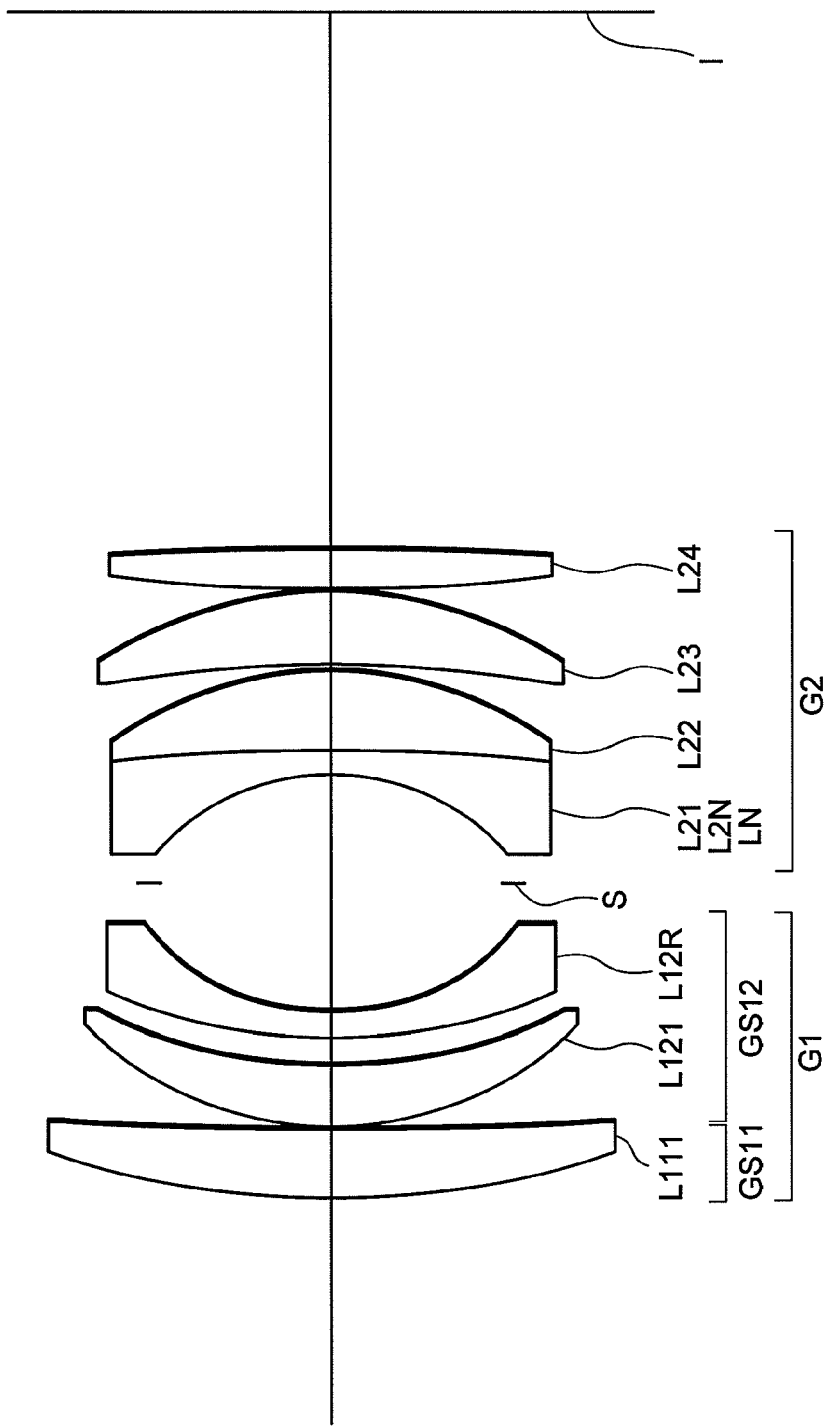
FIG. 16 is a sectional view showing a lens configuration of a lens system according to Example 8.

FIG. 16 is a sectional view showing a lens configuration of a lens system according to Example 8.

The lens system according to Example 8 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 8 are listed in Table 8.

In the lens system according to Example 8, the lens having highest refractive power at d-line (wavelength=587.6 nm) in the second lens group G2 is the lens L24. The lens L21 is the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

TABLE 8

[Specifications]

f = 51.62
FNO = 1.44
ω = 23.19
Y = 21.60
TL = 86.13

[Lens Data]

| i | r | d | nd | vd |
|---|---|---|---|---|
| 1 | 61.9292 | 5.2000 | 1.834807 | 42.71 |
| 2 | 250.9282 | 0.1000 | | |
| 3 | 25.5456 | 4.5000 | 2.003300 | 28.27 |
| 4 | 37.7633 | 1.8000 | | |
| 5 | 40.4696 | 2.0000 | 1.808090 | 22.79 |
| 6 | 17.5981 | 9.3000 | | |
| 7 | ∞ | 7.7000 | Aperture Stop S | |
| 8 | −17.8081 | 1.8000 | 1.846660 | 23.78 |
| 9 | −205.7528 | 6.0000 | 1.788001 | 47.37 |
| 10 | −27.6209 | 0.2000 | | |
| 11 | −110.8983 | 5.5000 | 1.804000 | 46.57 |
| 12 | −31.7495 | 0.1000 | | |
| 13 | 136.7328 | 3.0000 | 2.003300 | 28.27 |
| 14 | −375.0666 | (Bf) | | |

TABLE 8-continued

[Variable Distances]

|  | INF | CLD |
|---|---|---|
| R = | ∞ | 1.64 |
| β = | 0.0 | −1/30 |
| Bf = | 38.9302 | 40.6510 |

[Values for Conditional Expressions]

(2) f/f1 = 0.33611
(4) nNh = 1.846660
(5) |r2Na|/f = 0.34495
(7) Bf/f = 0.75410
(9) n2dh = 2.003300
(10) ν2dh = 28.27
(11) |r2a|/r1b = 1.01193

Figure 17A:
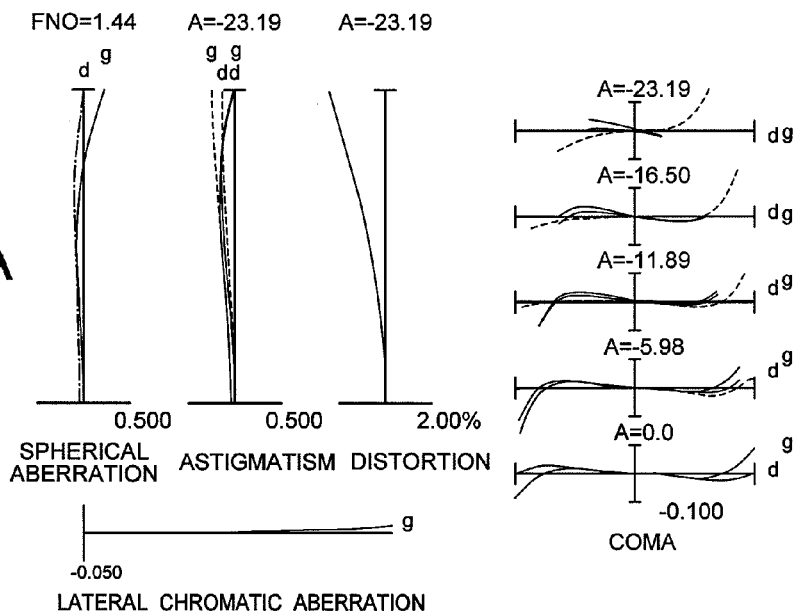
Figure 17B:
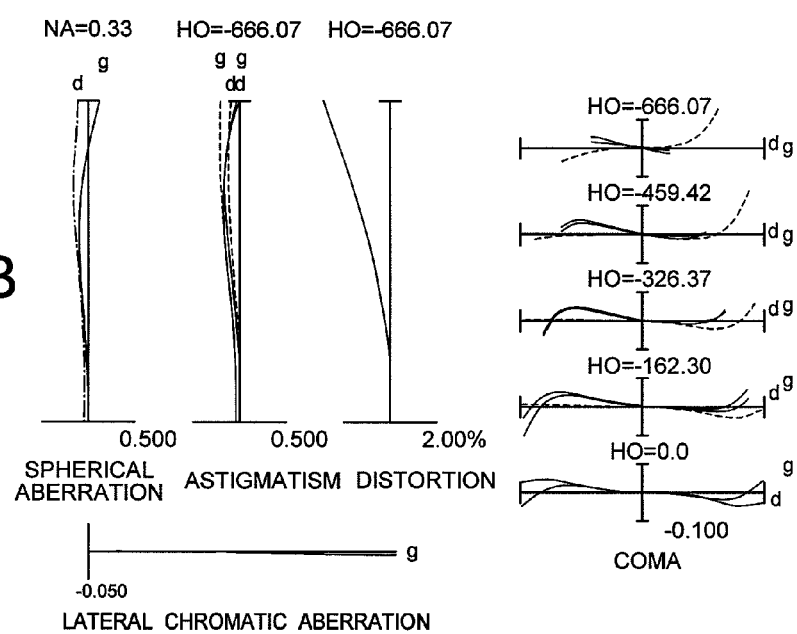

FIGS. 17A and 17B are graphs showing various aberrations of the lens system according to Example 8, in which FIG. 17A shows upon focusing on infinity (β=0.0), and FIG. 17B shows upon focusing on a close object (β=−1/30).

As is apparent from the respective graphs, the lens system according to Example 8 shows superb optical performance as a result of good corrections to various aberrations.

EXAMPLE 9

FIG. 18 is a sectional view showing a lens configuration of a lens system according to Example 9.

The lens system according to Example 9 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, which is constructed by a positive meniscus lens L111 having a convex surface facing the object side with stronger refractive power than an image side surface, and a sub-lens group GS12 having negative refractive power, which is constructed by a negative meniscus lens L121 having a convex surface facing the object side and a positive meniscus lens L12R having a concave surface facing the image side.

The second lens group G2 is composed of, in order from the object side along the optical axis, a cemented lens constructed by a double concave negative lens L21 whose radius of curvature of the object side surface is smaller than that of the image side surface cemented with a double convex positive lens L22 whose radius of curvature of the image side surface is smaller than that of the object side surface, a positive meniscus lens L23 having a convex surface facing the image side, and a double convex positive lens L24 disposed to the most image side with stronger refractive power on the image side surface with respect to the object side surface. Light ray come out from the lens L24 forms an image on the image plane I.

Focusing on a close object is carried out by moving the first lens group G1 and the second lens group G2 toward the object side in a body.

In Example 9, although the lens element L111 is composed of a single lens, the lens element L111 may, be a cemented lens. In this case, spherical aberration and longitudinal chromatic aberration can be excellently corrected.

Various values associated with the lens system according to Example 9 are listed in Table 9.

In the lens system according to Example 9, the lens having highest refractive power at d-line (wavelength=587.6 nm) composing the second lens group G2 is the lens L24. The lenses L121 and L21 are the negative lens LN satisfying conditional expression (4), and the lens L21 is also the negative lens L2N having a concave surface facing the object side. Here, the radius of curvature of the object side surface of the lens L21 is r2Na and r2a, and the radius of curvature of the image side surface of the lens L12R is r1b.

TABLE 9

[Specifications]

f = 51.60
FNO = 2.06
ω = 25.23
Y = 24.00
TL = 107.25

[Lens Data]

| i | r | d | nd | νd |
|---|---|---|---|---|
| 1 | 50.5356 | 4.0000 | 1.799516 | 42.22 |
| 2 | 154.2377 | 1.0000 | | |
| 3 | 24.8887 | 2.0000 | 1.834807 | 42.71 |
| 4 | 16.7477 | 7.0000 | | |
| 5 | 17.2732 | 2.5000 | 2.019600 | 21.45 |
| 6 | 16.8254 | 8.0000 | | |
| 7 | ∞ | 9.0000 | Aperture Stop S | |
| 8 | −20.4694 | 1.5000 | 1.860740 | 23.06 |
| 9 | 547.0172 | 8.2000 | 1.754999 | 52.32 |
| 10 | −25.9174 | 1.0000 | | |
| 11 | −113.9151 | 4.3000 | 1.834807 | 42.71 |
| 12 | −37.7986 | 0.5000 | | |
| 13 | 391.9984 | 3.3000 | 1.903658 | 31.31 |
| 14 | −161.9377 | (Bf) | | |

[Variable Distances]

|  | INF | CLD |
|---|---|---|
| R = | ∞ | 1.66 |
| β = | 0.0 | −1/30 |
| Bf = | 54.9471 | 56.6672 |

[Values for Conditional Expressions]

(2) f/f1 = 0.00263
(4) nNh = 1.834807 (L121)
(4) nNh = 1.860740 (L21)
(5) |r2Na|/f = 0.39668
(7) Bf/f = 1.06482
(9) n2dh = 1.903658
(10) ν2dh = 31.31
(11) |r2a|/r1b = 1.21658

Figure 19A:
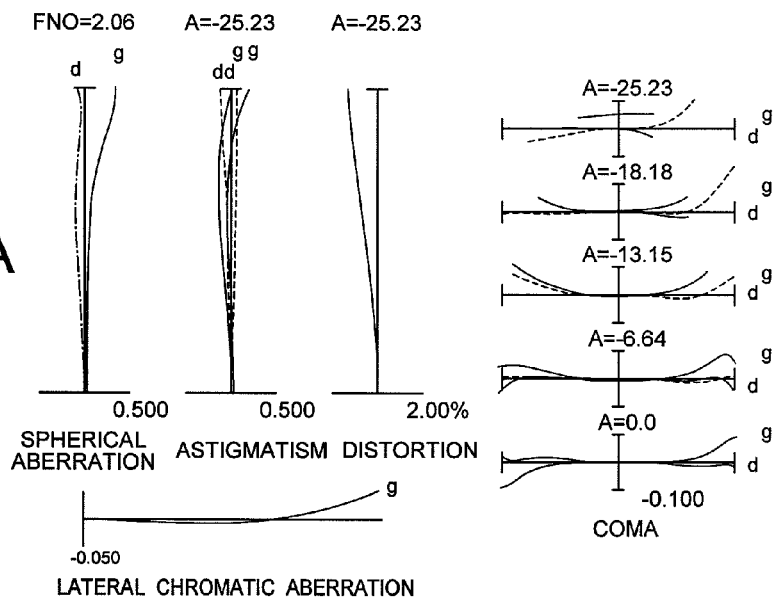
Figure 19B:
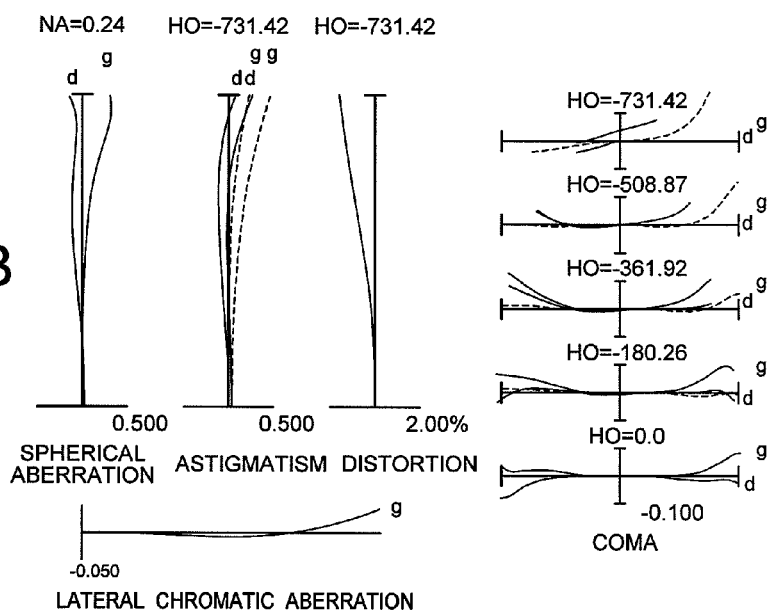

FIGS. 19A and 19B are graphs showing various aberrations of the lens system according to Example 9, in which FIG. 19A shows upon focusing on infinity (β=0.0), and FIG. 19B shows upon focusing on a close object (β=−1/30).

As is apparent from the respective graphs, the lens system according to Example 9 shows superb optical performance as a result of good corrections to various aberrations.

Then, an antireflection coating used in the lens system according to Example 1 through 9 is explained.

Figure 20:
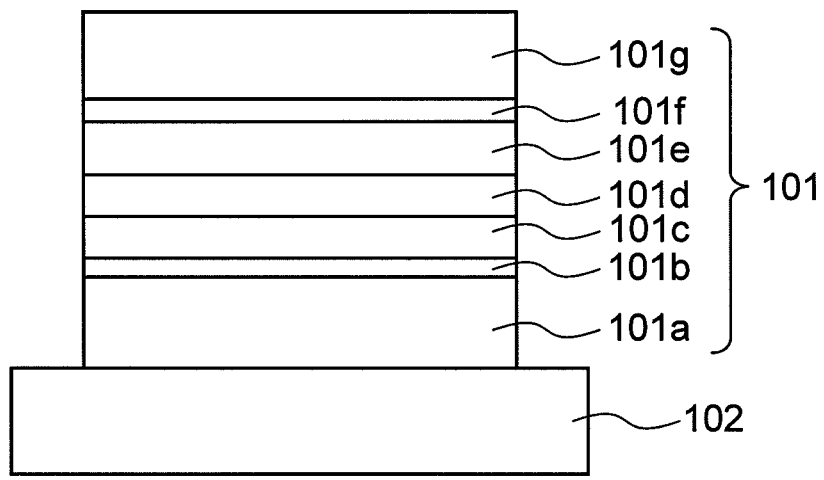
FIG. 20 is an explanatory view showing a configuration of an antireflection coating according to the present embodiment.

FIG. 20 is an explanatory view showing a configuration of an antireflection coating according to the present embodiment. The antireflection coating 101 is composed of seven layers and is formed on an optical surface of an optical member 102 such as a lens. A first layer 101a is formed with aluminum oxide by means of a vacuum evaporation method. On the first layer 101a, a second layer 101b formed with mixture of titanium oxide and zirconium oxide by means of a vacuum evaporation method is formed. Moreover, on the second layer 101b, a third layer 101c formed with aluminum oxide by means of vacuum evaporation method is formed. Moreover, on the third layer 101c, a fourth layer 101f formed with a mixture of titanium oxide and zirconium oxide by means of a vacuum evaporation method is formed. Furthermore, on the fourth layer 101d, a fifth layer 101e formed with aluminum oxide by means of vacuum evaporation method is formed. On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating according to the present embodiment. In order to form the seventh layer 101g, a sol-gel process, which is a kind of wet process, is used. The sol-gel process is a method for forming a film such that an optical-thin-film-material sol is applied to an optical surface of an optical member, after accumulating the gel film it is dipped into a liquid, and the liquid is vaporized and dried with controlling temperature and pressure of the liquid over the critical state to form the film. Incidentally, a wet-process is not necessarily limited to the sol-gel process, a method that a solid film is obtained without undergoing through gel state may be used.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. At first, an aluminum oxide layer, which becomes a first layer 101a, a mixture of titanium oxide and zirconium oxide layer, which becomes a second layer 101b, an aluminum oxide layer, which becomes a third layer 101a, a mixture of titanium oxide and zirconium oxide layer, which becomes a fourth layer 101b, an aluminum oxide layer, which becomes a fifth layer 101a, and a mixture of titanium oxide and zirconium oxide layer, which becomes a sixth layer 101b are formed on a film-forming surface (the above-mentioned optical surface of the optical member 102) in this order by a vacuum evaporation equipment. Then, after being took out from the vacuum evaporation equipment, the optical member 102 is applied with a sol liquid prepared by the hydrofluoric acid/magnesium acetate method by means of a spin coat method, so that a layer formed by a mixture of silica and magnesium fluoride, which becomes a seventh layer 101g, is formed. A reaction formula prepared by the hydrofluoric acid/magnesium acetate method is shown by expression (12):

2HF+Mg(CH3COO)2→MgF2+2CH3COOH (12).

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With using such a sol gel method, atoms or molecules are built up from several to several tens to become particles of several nanometers to several tens of nanometers, and several these particles are built up to form secondary particles. As a result, the secondary particles are piled up to form the seventh layer 101g.

Figure 21:
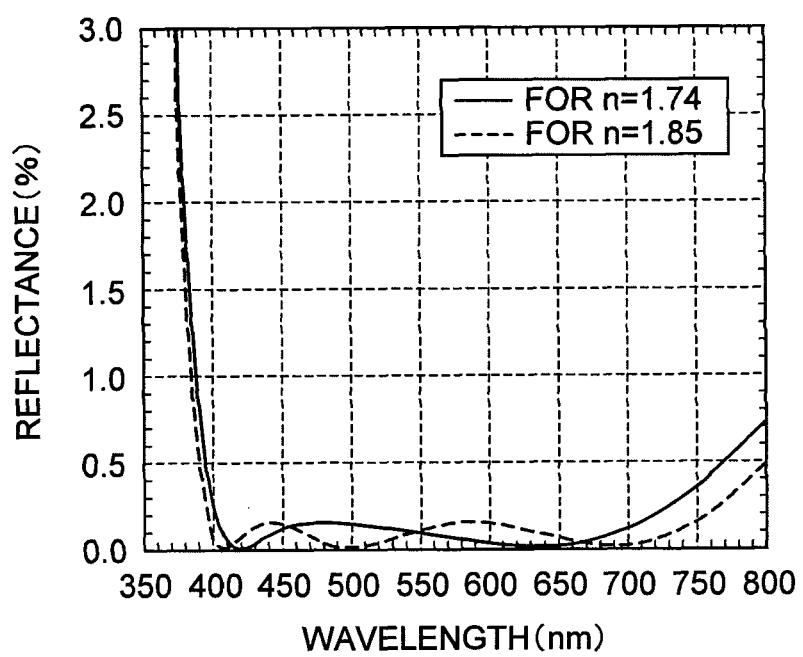
FIG. 21 is a graph showing spectral reflectance of an anti reflection coating according to the present embodiment.

Then, optical performance of the antireflection coating 101 formed in this manner is explained with using spectral characteristic shown in FIG. 21. FIG. 21 is a graph showing spectral reflectance of an anti reflection coating of normal incidence at reference wavelength of 550 nm upon designing the antireflection coating 101 with a condition shown below in Table 10. In Table 10, an aluminum oxide layer is denoted by Al2O3, a mixture of titanium oxide and zirconium oxide layer is denoted by ZrO2+TiO2, and a mixture of silica and magnesium fluoride is denoted by SiO2+MgF2. Designed values (t1 through t4) with respect to refractive indices of the substrate of 1.46 (t1), 1.62 (t2), 1.74 (t3) and 1.85 (t4) upon reference wavelength of 550 nm are shown. Incidentally, even if the reference wavelength is d-line (wavelength=587.6 nm), characteristics of the antireflection film is hardly affected.

TABLE 10

| layer | material | n | t1 | t2 | t3 | t4 |
|---|---|---|---|---|---|---|
| medium | air | 1 | | | | |
| 7 | SiO$_2$ + MgF$_2$ | 1.26 | 0.275λ | 0.268λ | 0.271λ | 0.269λ |
| 6 | ZrO$_2$ + TiO$_2$ | 2.12 | 0.045λ | 0.057λ | 0.054λ | 0.059λ |
| 5 | Al$_2$O$_3$ | 1.65 | 0.212λ | 0.171λ | 0.178λ | 0.162λ |
| 4 | ZrO$_2$ + TiO$_2$ | 2.12 | 0.077λ | 0.127λ | 0.13λ | 0.158λ |
| 3 | Al$_2$O$_3$ | 1.65 | 0.288λ | 0.122λ | 0.107λ | 0.08λ |
| 2 | ZrO$_2$ + TiO$_2$ | 2.12 | 0 | 0.059λ | 0.075λ | 0.105λ |
| 1 | Al$_2$O$_3$ | 1.65 | 0 | 0.257λ | 0.03λ | 0.03λ |

As understood from FIG. 21, reflectance is sufficiently suppressed under 0.2% over entire wavelength range from 420 nm to 720 nm.

In the lens system according to Example 1, since refractive index of the negative meniscus lens L12R is 1.761821 and refractive index of the negative meniscus lens L21 is 1.805181, an antireflection coating corresponding to a refractive index of the substrate of 1.74 can be applied to the image side lens surface of the negative meniscus lens L12R, and an antireflection coating corresponding to a refractive index of the substrate of 1.85 can be applied to the object side lens surface of the negative meniscus lens L21.

In the lens system according to Example 2, since refractive index of the negative meniscus lens L12R is 1.860740 and refractive index of the negative meniscus lens L21 is 1.805181, an antireflection coating corresponding to a refractive index of the substrate of 1.85 can be applied to the image side lens surface of the negative meniscus lens L12R, and an antireflection coating corresponding to a refractive index of the substrate of 1.85 can be applied to the object side lens surface of the negative meniscus lens L21.

In the lens system according to Example 3, since refractive index of the negative meniscus lens L21 is 1.805181, an antireflection coating corresponding to a refractive index of the substrate of 1.85 can be applied to the object side lens surface of the negative meniscus lens L21.

In the lens system according to Example 4, since refractive index of the negative meniscus lens L21 is 1.805181, an antireflection coating corresponding to a refractive index of the substrate of 1.85 can be applied to the object side lens surface of the negative meniscus lens L21.

In the lens system according to Example 5, since refractive index of the negative meniscus lens L12R is 1.805181 and refractive index of the negative meniscus lens L21 is 1.846660, an antireflection coating corresponding to a refractive index of the substrate of 1.85 can be applied to the image side lens surface of the negative meniscus lens L12R, and an antireflection coating corresponding to a refractive index of the substrate of 1.85 can be applied to the object side lens surface of the negative meniscus lens L21.

In the lens system according to Example 6, since refractive index of the negative meniscus lens L21 is 1.860740, an antireflection coating corresponding to a refractive index of the substrate of 1.85 can be applied to the object side lens surface of the negative meniscus lens L21.

In the lens system according to Example 7, since refractive index of the negative meniscus lens L12R is 1.808090 and refractive index of the negative meniscus lens L21 is 1.846660, an antireflection coating corresponding to a refractive index of the substrate of 1.85 can be applied to the image side lens surface of the negative meniscus lens L12R, and an antireflection coating corresponding to a refractive index of the substrate of 1.85 can be applied to the object side lens surface of the negative meniscus lens L21.

In the lens system according to Example 8, since refractive index of the negative meniscus lens L12R is 1.808090 and refractive index of the negative meniscus lens L21 is 1.846660, an antireflection coating corresponding to a refractive index of the substrate of 1.85 can be applied to the image side lens surface of the negative meniscus lens L12R, and an antireflection coating corresponding to a refractive index of the substrate of 1.85 can be applied to the object side lens surface of the negative meniscus lens L21.

In the lens system according to Example 9, since refractive index of the negative meniscus lens L21 is 1.860740, an antireflection coating corresponding to a refractive index of the substrate of 1.85 can be applied to the object side lens surface of the negative meniscus lens L21.

Incidentally, the antireflection coating 101 can be applied to a plane parallel optical surface and to an optical surface of a lens formed by a curved shape.

Then, a variation example of an antireflection coating is explained. The antireflection coating is constructed by five layers and is formed by a condition shown in Table 11. Incidentally, the above-described sol-gel method is used for forming the fifth layer. In Table 11, design values with respect to refractive index of the substrate of 1.52 at reference wavelength λ of 550 nm are shown.

TABLE 11

| layer | material | n | thickness |
|---|---|---|---|
| medium | air | 1 | |
| 5 | SiO$_2$ + MgF$_2$ | 1.26 | 0.269λ |
| 4 | ZrO$_2$ + TiO$_2$ | 2.12 | 0.043λ |
| 3 | Al$_2$O$_3$ | 1.65 | 0.217λ |
| 2 | ZrO$_2$ + TiO$_2$ | 2.12 | 0.066λ |
| 1 | Al$_2$O$_3$ | 1.65 | 0.290λ |
| substrate | BK7 | 1.52 | |

Figure 22:
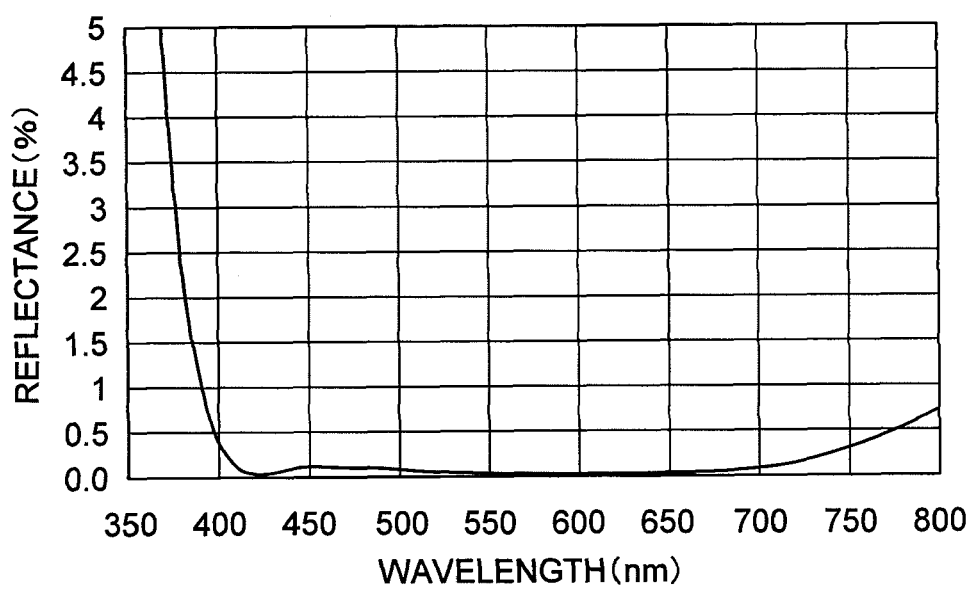
FIG. 22 is a graph showing spectral reflectance of an anti reflection coating according to a variation.
Figure 23:
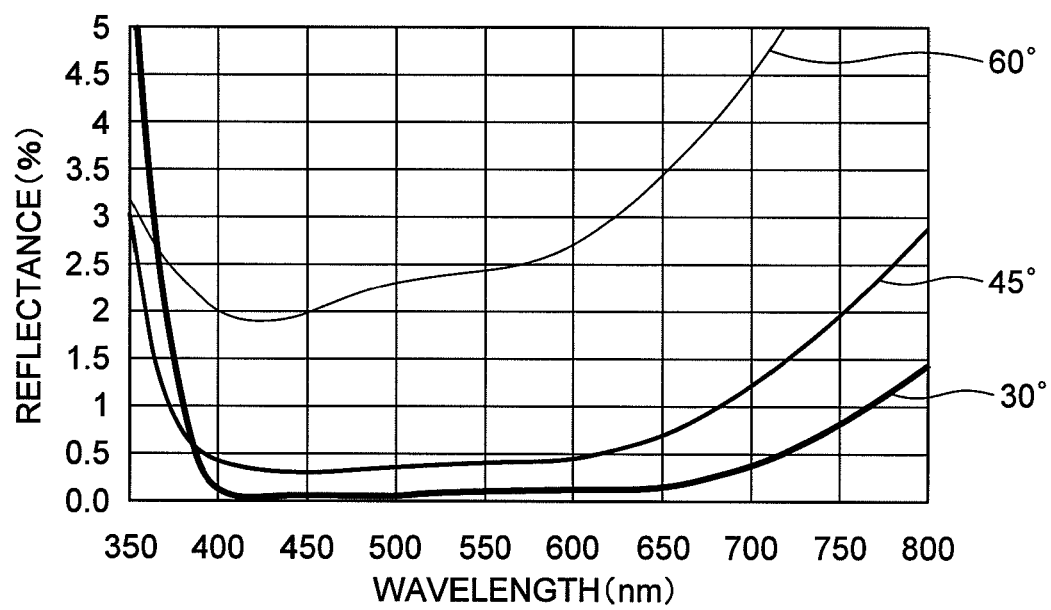
FIG. 23 is a graph showing spectral reflectance of an anti reflection coating according to a variation.

FIG. 22 is a graph showing spectral reflectance of normal incidence of the anti reflection coating according to the variation example. As shown in FIG. 22, reflectance is sufficiently suppressed under 0.2% over entire wavelength range from 420 nm to 720 nm. FIG. 23 is a graph showing spectral reflectance of the anti reflection coating in the case of angle of incidence of 30 degrees, 45 degrees and 60 degrees.

Figure 24:
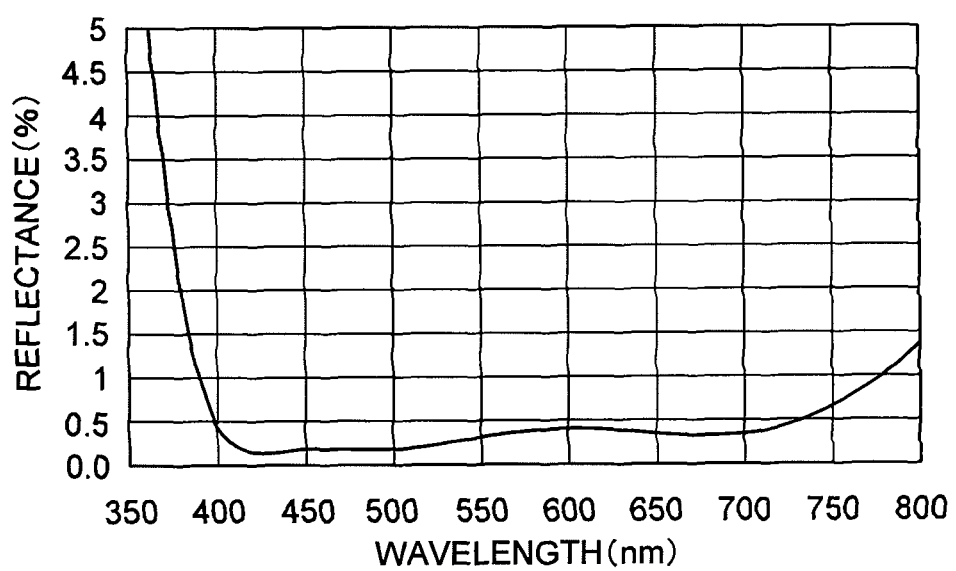
FIG. 24 is a graph showing spectral reflectance of an anti reflection coating according to a conventional example.
Figure 25:
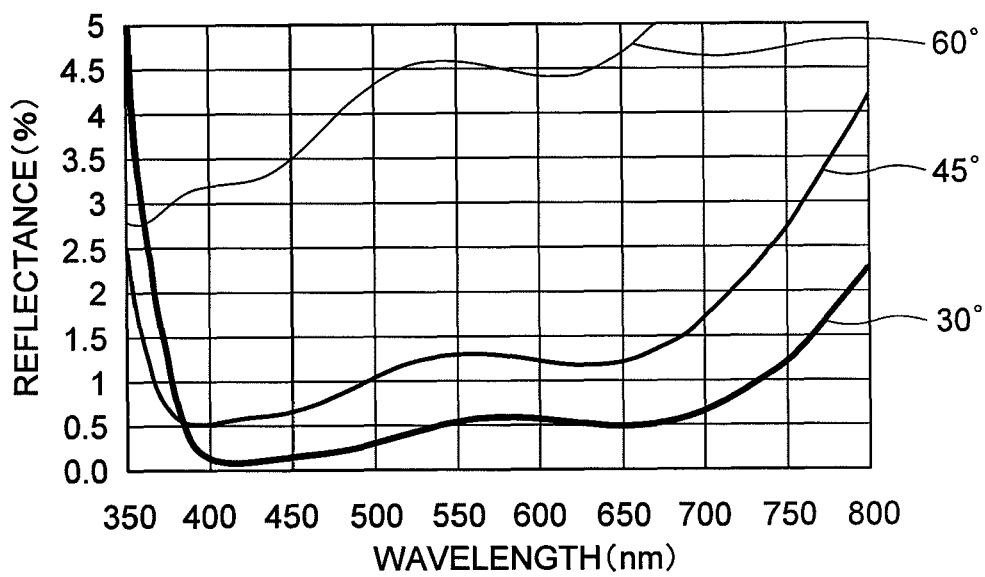
FIG. 25 is a graph showing spectral reflectance of an anti reflection coating according to a conventional example.

For the purpose of comparison, spectral reflectance of normal incidence of a multilayer-broad-range-antireflection coating composed of a condition shown in Table 12 formed by only dry process such as a conventional vacuum evaporation method is shown in FIG. 24. FIG. 25 is a graph showing spectral reflectance of the anti reflection coating in the case of angle of incidence of 30 degrees, 45 degrees and 60 degrees.

TABLE 12

| layer | material | n | thickness |
|---|---|---|---|
| medium | air | 1 | |
| 7 | SiO$_2$ + MgF$_2$ | 1.39 | 0.243λ |
| 6 | ZrO$_2$ + TiO$_2$ | 2.12 | 0.119λ |

TABLE 12-continued

| layer | material | n | thickness |
|---|---|---|---|
| 5 | Al$_2$O$_3$ | 1.65 | 0.057λ |
| 4 | ZrO$_2$ + TiO$_2$ | 2.12 | 0.220λ |
| 3 | Al$_2$O$_3$ | 1.65 | 0.064λ |
| 2 | ZrO$_2$ + TiO$_2$ | 2.12 | 0.057λ |
| 1 | Al$_2$O$_3$ | 1.65 | 0.193λ |
| substrate | BK7 | 1.52 | |

Spectral reflectance of the variation example shown in FIGS. 22 and 23 is that of conventional example. It is obvious that spectral reflectance of the variation example shows very low values.

As described above, the present invention makes it possible to provide a lens system having high optical performance, a large aperture ratio, and a long back focal length with excellently correcting various aberrations and suppressing ghost images and flare, and an optical apparatus equipped therewith.

Then, a camera, which is an optical apparatus equipped with the lens system according to the present embodiment, is explained. Although a case that the lens system according to Example 1 is installed is explained, the same result can be obtained by a lens system according to any other Example.

Figure 26:
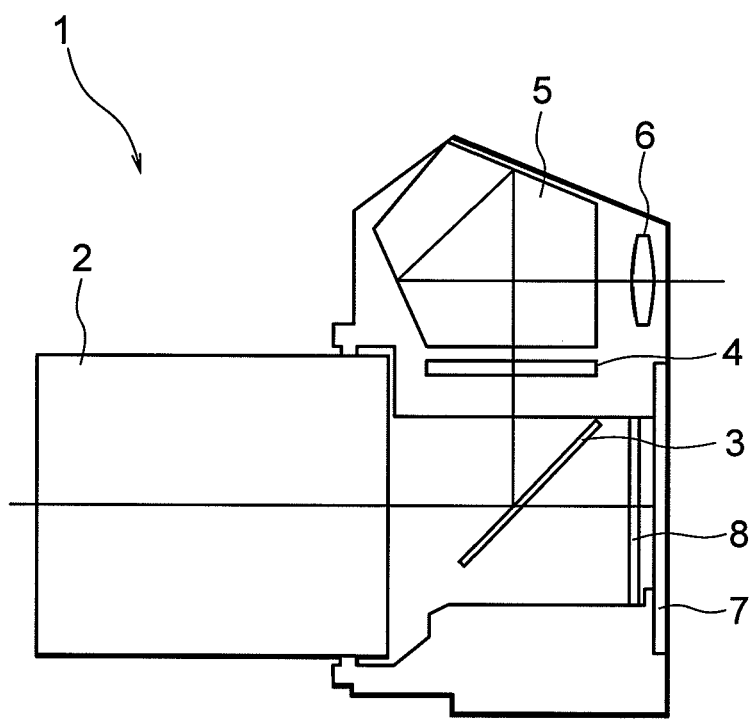
FIG. 26 is a diagram showing a construction of a camera equipped with the lens system according to Example 1.

FIG. 26 is a sectional view showing a single-lens reflex digital camera equipped with the lens system according to Example 1.

In FIG. 26, the camera 1 is a single-lens reflex digital camera 1 equipped with the lens system according to Example 1 as an imaging lens 2. In the camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light from the unillustrated object is formed an object image on an imaging device 7. Accordingly, the light emitted from the object is captured by the imaging device 7, and stored in an unillustrated memory as a photographed image of the object. In this manner, the photographer can take a picture of an object by the camera 1.

With installing the lens system according to Example 1 as an imaging lens 2 into the camera 1, it becomes possible to realize a camera having high optical performance.

Incidentally, the following description may suitably be applied within limits that do not deteriorate optical performance.

In the above described explanations and Examples, although lens systems having a two-lens-group configuration has been shown, the above described lens configuration can be applied to other lens configurations such as a three-lens-group configuration and a four-lens-group configuration. Specifically, a lens configuration in which a positive lens group or a negative lens group is added to the most object side, and a lens configuration in which a positive lens group or a negative lens group is added to the most image side may be listed. A lens configuration that a positive lens group or a negative lens group is added between the first lens group and the second lens group can be mentioned.

In order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the first lens group or the second lens group is moved as the focusing lens group.

Moreover, a lens group or a portion of a lens group may be moved as a vibration reduction lens group in a direction perpendicular to the optical axis thereby correcting an image blur caused by a camera shake. In particular, at least a portion of the first lens group or the second lens group is preferably made as a vibration reduction lens group.

Although an aperture stop is preferably disposed between the first lens group and the second lens group, the function may be substituted by a lens frame without disposing a member as an aperture stop.

The present embodiment only shows a specific example for the purpose of better understanding of the present application. Accordingly, it is needless to say that the present application in its broader aspect is not limited to the specific details and representative devices.

What is claimed is:

1. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
the following conditional expressions being satisfied:

$$1.910 < ndh$$

$$-0.400 < f/f1 < 0.500$$

$$24.0 < vdh$$

where ndh denotes a refractive index at d-line (wavelength=587.6 nm) of a lens having the highest refractive index at d-line in the lens system, f1 denotes a focal length of the first lens group, f denotes a focal length of the lens system, and vdh denotes an Abbe number at d-line of the lens having the highest refractive index at d-line in the lens system,
an antireflection coating being formed on at least one optical surface in the first lens group and the second lens group, and
the antireflection coating including at least one layer formed by a wet-process.

2. The lens system according to claim 1, wherein the antireflection coating is a multilayer film, and the layer formed by the wet-process is the uppermost layer among layers composing the antireflection coating.

3. The lens system according to claim 1, wherein the following conditional expression is satisfied:

$$nd < 1.30$$

where nd denotes a refractive index at d-line of the layer formed by the wet-process.

4. The lens system according to claim 1, wherein the optical surface on which the antireflection coating is formed is a concave surface facing an aperture stop.

5. The lens system according to claim 1, wherein the optical surface on which the antireflection coating is formed is a concave surface facing an image plane.

6. The lens system according to claim 1, wherein the first lens group consists of the sub-lens group having positive refractive power and the sub-lens group having negative refractive power.

7. The lens system according to claim 1, wherein an aperture stop is disposed between the first lens group and the second lens group.

8. The lens system according to claim 1, wherein the sub-lens group having positive refractive power includes a positive lens element to the most object side, and an absolute value of a radius of curvature of the object side surface of the positive lens element is smaller than that of the image side surface of the positive lens element.

9. The lens system according to claim 1, wherein the sub-lens group having positive refractive power is composed of only positive lens elements.

10. The lens system according to claim 1, wherein the lens system includes at least one negative lens satisfying the following conditional expression:

$$1.820 < nNh$$

where nNh denotes a refractive index at d-line of the negative lens.

11. The lens system according to claim 1, wherein the most image side lens in the sub-lens group having negative refractive power is a negative lens having a concave surface facing the image side.

12. The lens system according to claim 1, wherein the second lens group includes at least one negative lens having a concave surface facing the object side, and the following conditional expression is satisfied:

$$0.300 < |r2Na|/f < 0.600$$

where r2Na denotes a radius of curvature of the object side surface of the at least one negative lens having a concave surface facing the object side.

13. The lens system according to claim 12, wherein the at least one negative lens having a concave surface facing the object side is disposed to the most object side in the second lens group.

14. The lens system according to claim 1, wherein the following conditional expression is satisfied:

$$0.800 < |r2a|/r1b < 1.200$$

where r1b denotes a radius of curvature of the most image side lens surface in the first lens group, and r2a denotes a radius of curvature of the most object side lens surface in the second lens group.

15. The lens system according to claim 1, wherein the following conditional expression is satisfied:

$$0.600 < Bf/f < 1.000$$

where Bf denotes a distance along an optical axis between the most image side lens surface of the lens system and the image plane.

16. The lens system according to claim 1, wherein a distance between the first lens group and the second lens group is always fixed.

17. An optical apparatus equipped with the lens system according to claim 1.

18. A lens system comprising, in order from an object side:
a first lens group; and
a second lens group having positive refractive power;
the first lens group including a sub-lens group having positive refractive power, and a sub-lens group having negative refractive power, the sub-lens group having negative refractive power including a meniscus lens having a convex surface facing the object side,
the lens system including at least one negative lens and satisfying the following conditional expressions:

$$1.820 < nNh$$

$$-0.400 < f/f1 < 0.500$$

$$12.0 < vdN < 24.0$$

where nNh denotes a refractive index at d-line (wavelength=587.6 nm) of the negative lens, f1 denotes a focal length of the first lens group, f denotes a focal length of the lens system, and vdN denotes an Abbe number at d-line of the negative lens,
an antireflection coating being formed on at least one optical surface in the first lens group and the second lens group, and
the antireflection coating including at least one layer formed by a wet-process.

19. The lens system according to claim 18, wherein the negative lens has a meniscus shape.

20. The lens system according to claim 18, wherein the negative lens is disposed to the most image side of the first lens group, and has a concave surface facing the image side.

21. An optical apparatus equipped with the lens system according to claim 18.

22. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
the following conditional expressions being satisfied:

$$1.890 < n2dh$$

$$-0.400 < f/f1 < 0.500$$

$$24.0 < v2dh$$

where n2*dh* denotes a refractive index at d-line (wavelength=587.6 nm) of a lens having the highest refractive index at d-line in the second lens group, f1 denotes a focal length of the first lens group, f denotes a focal length of the lens system, and v2*dh* denotes an Abbe number at d-line of the lens having the highest refractive index at d-line in the second lens group,
an antireflection coating being formed on at least one optical surface in the first lens group and the second lens group, and
the antireflection coating including at least one layer formed by a wet-process.

23. A method for manufacturing a lens system including, in order from an object side along an optical axis, a first lens group and a second lens group, the method comprising steps of:
applying an antireflection coating including at least one layer formed by a wet-process on at least one optical surface in the first lens group and the second lens group;
disposing a meniscus lens having a convex surface facing the object side in a sub-lens group having negative refractive power; and
disposing the first lens group and the second lens group in such a manner that the first lens group includes a sub-lens group having positive refractive power and the sub-lens group having negative refractive power, and the second lens group has positive refractive power;
with the following conditional expressions being satisfied:

$$1.910 < ndh$$

$$-0.400 < f/f1 < 0.500$$

$$24.0 < vdh$$

where ndh denotes a refractive index at d-line (wavelength=587.6 nm) of a lens having the highest refractive index at d-line in the lens system, f1 denotes a focal length of the first lens group, f denotes a focal length of the lens system, and vdh denotes an Abbe number at d-line of the lens having the highest refractive index at d-line in the lens system.

24. The method according to claim 23, further comprising a step of:
disposing at least one negative lens satisfying the following conditional expression:

$$1.820 < nNh$$

where nNh denotes a refractive index at d-line of the negative lens.

25. The method according to claim 23, further comprising a step of:
disposing the second lens group including at least one negative lens having a concave surface facing the object side, with the following conditional expression being satisfied:

$$0.300 < |r2Na|/f < 0.600$$

where r2Na denotes a radius of curvature of the object side surface of the at least one negative lens having a concave surface facing the object side.

26. A method for manufacturing a lens system including, in order from an object side along an optical axis, a first lens group and a second lens group, the method comprising steps of:
applying an antireflection coating including at least one layer formed by a wet-process on at least one optical surface in the first lens group and the second lens group;
disposing a meniscus lens having a convex surface facing the object side in a sub-lens group having negative refractive power;
disposing the first lens group and the second lens group in such a manner that the first lens group includes a sub-lens group having positive refractive power and the sub-lens group having negative refractive power, and the second lens group has positive refractive power; and
disposing at least one negative lens in the lens system with the following conditional expressions being satisfied:

$$1.820 < nNh$$

$$-0.400 < f/f1 < 0.500$$

$$12.0 < vdN < 24.0$$

where nNh denotes a refractive index at d-line (wavelength=587.6 nm) of the negative lens, f1 denotes a focal length of the first lens group, and f denotes a focal length of the lens system, and vdN denotes an Abbe number at d-line of the negative lens.

27. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
an antireflection coating being formed on at least one optical surface in the first lens group and the second lens group,
the antireflection coating including at least one layer formed by a wet-process, and
the following conditional expressions being satisfied:

$$1.910 < ndh$$

$$-0.400 < f/f1 < 0.500$$

$$nd < 1.30$$

where ndh denotes a refractive index at d-line (wavelength=587.6 nm) of a lens having the highest refractive index at d-line in the lens system, f1 denotes a focal length of the first lens group, f denotes a focal length of the lens system, and nd denotes a refractive index at d-line of the layer formed by the wet-process.

28. A method for manufacturing a lens system including, in order from an object side along an optical axis, a first lens group and a second lens group, the method comprising steps of:
applying an antireflection coating including at least one layer formed by a wet-process on at least one optical surface in the first lens group and the second lens group;
disposing a meniscus lens having a convex surface facing the object side in a sub-lens group having negative refractive power; and
disposing the first lens group and the second lens group in such a manner that the first lens group includes a sub-lens group having positive refractive power and the sub-lens group having negative refractive power, and the second lens group has positive refractive power;
with the following conditional expressions being satisfied:

$$1.910 < ndh$$

$$-0.400 < f/f1 < 0.500$$

$$nd < 1.30$$

where ndh denotes a refractive index at d-line (wavelength=587.6 nm) of a lens having the highest refractive index at d-line in the lens system, f1 denotes a focal length of the first lens group, f denotes a focal length of the lens system, and nd denotes a refractive index at d-line of the layer formed by the wet-process.

29. The method according to claim 23, wherein the first lens group consists of the sub-lens group having positive refractive power and the sub-lens group having negative refractive power.

30. The method according to claim 26, wherein the first lens group consists of the sub-lens group having positive refractive power and the sub-lens group having negative refractive power.

31. The method according to claim 28, wherein the first lens group consists of the sub-lens group having positive refractive power and the sub-lens group having negative refractive power.

* * * * *